(12) United States Patent
Wang et al.

(10) Patent No.: US 12,299,586 B2
(45) Date of Patent: May 13, 2025

(54) HYBRID MACHINE LEARNING MODEL FOR CODE CLASSIFICATION

(71) Applicant: DOW GLOBAL TECHNOLOGIES LLC, Midland, MI (US)

(72) Inventors: Chun Wang, Midland, MI (US); John Martin Wassick, Midland, MI (US); Vicki Rothhaar, Midland, MI (US); Kalyanmoy Deb, East Lansing, MI (US); Yashesh Deepakkumer Dhebar, East Lansing, MI (US); Erik David Goodman, East Lansing, MI (US)

(73) Assignee: THE DOW CHEMICAL COMPANY, Midland, MI (US)

( * ) Notice: Subject to any disclaimer, the term of this patent is extended or adjusted under 35 U.S.C. 154(b) by 1035 days.

(21) Appl. No.: 17/279,439

(22) PCT Filed: Sep. 11, 2019

(86) PCT No.: PCT/US2019/050555
§ 371 (c)(1),
(2) Date: Mar. 24, 2021

(87) PCT Pub. No.: WO2020/068421
PCT Pub. Date: Apr. 2, 2020

(65) Prior Publication Data
US 2021/0406701 A1    Dec. 30, 2021

Related U.S. Application Data

(60) Provisional application No. 62/738,482, filed on Sep. 28, 2018.

(51) Int. Cl.
*G06N 20/00*        (2019.01)
*G06N 5/01*         (2023.01)

(52) U.S. Cl.
CPC ............... *G06N 5/01* (2023.01); *G06N 20/00* (2019.01)

(58) Field of Classification Search
CPC ................................. G06N 5/01; G06N 20/00
See application file for complete search history.

(56) References Cited

U.S. PATENT DOCUMENTS 5,774,854 A * 6/1998 Sharman ................. G10L 13/08
                                                              704/E13.011
7,693,854 B2    4/2010 Uy et al.
(Continued)

FOREIGN PATENT DOCUMENTS

| CN | 101918961 B | 5/2015 |
|----|-------------|--------|
| CN | 107766337 A | 3/2018 |

(Continued)

OTHER PUBLICATIONS

The International Search Report (ISR) with Written Opinion for PCT/US2019/050555 dated Nov. 26, 2019, pp. 1-15.
(Continued)

*Primary Examiner* — Tamara T Kyle
*Assistant Examiner* — William Wong
(74) *Attorney, Agent, or Firm* — MCDONNELL BOEHNEN HULBERT & BERGHOFF LLP

(57) ABSTRACT

An embodiment involves a hybrid machine learning classifier that uses a random forest of decision tree classifiers to predict a tariff code prefix, and uses a plurality of expert trees to predict a tariff code suffix from properties related to chemical components associated with the respective tariff code prefixes. The embodiment also involves: determining a proportion of a dominant chemical component in comparison to other chemical components in a new set of chemical components; calculating similarity scores for the new set of chemical components and words associated with the tariff
(Continued)

code prefixes; generating a feature vector from the proportion and the similarity scores; and obtaining a predicted tariff code including a predicted tariff code prefix determined by applying the random forest to the feature vector, and a predicted tariff code suffix determined by traversing a particular expert tree in accordance with properties related to the new set of chemical components.

20 Claims, 24 Drawing Sheets

(56) References Cited

U.S. PATENT DOCUMENTS

| | | | |
|---|---|---|---|
| 7,792,863 B2 | 9/2010 | Uy et al. | |
| 8,495,068 B1 | 7/2013 | Awalt et al. | |
| 8,626,618 B2 | 1/2014 | Psota | |
| 2002/0123995 A1* | 9/2002 | Shibuya | G06F 16/90344 |
| 2003/0125928 A1* | 7/2003 | Lee | G06F 40/47 |
| | | | 704/4 |
| 2003/0163447 A1 | 8/2003 | Sandman | |
| 2005/0004894 A1 | 1/2005 | Uy | |
| 2005/0055200 A1* | 3/2005 | Park | G06F 40/268 |
| | | | 704/4 |
| 2007/0094256 A1* | 4/2007 | Hite | G06F 16/367 |
| | | | 707/E17.135 |
| 2010/0192022 A1* | 7/2010 | Seki | G06F 11/3409 |
| | | | 714/E11.179 |
| 2012/0124050 A1 | 5/2012 | Yang et al. | |
| 2012/0130927 A1 | 5/2012 | Shimogori | |
| 2014/0219538 A1* | 8/2014 | Guthrie | G06V 20/69 |
| | | | 382/133 |
| 2015/0161728 A1 | 6/2015 | Song | |
| 2016/0071431 A1* | 3/2016 | Jain | G09B 19/0092 |
| | | | 434/127 |
| 2016/0225053 A1* | 8/2016 | Romley | G06T 7/143 |
| 2016/0350294 A1* | 12/2016 | Nefedov | G06F 16/367 |
| 2017/0124482 A1 | 5/2017 | Yoo | |
| 2018/0144316 A1 | 5/2018 | Gal | |
| 2020/0057987 A1* | 2/2020 | Schrade | G06Q 10/0831 |

FOREIGN PATENT DOCUMENTS

| | | |
|---|---|---|
| CN | 106803124 B | 4/2020 |
| CN | 108391446 B | 2/2022 |
| JP | 2012118749 A | 6/2012 |
| JP | 2018526732 A | 9/2018 |
| WO | 2012029152 A2 | 3/2012 |
| WO | 2016/057000 | 4/2016 |

OTHER PUBLICATIONS

Tin Kam Ho., "Random Decision Forests", Proceedings of the Third International Conference on Document Analysis and Recognition, IEEE, 1995, pp. 278-282.

Chawla et al., "SMOTE: Synthetic Minority Over-sampling Technique", Journal of artificial Intelligence Research 16 (2002) 321-357.

V. I. Levenshtein., "Binary Codes Capable of Correcting Deletions, Insertions, and Reversals", Soviet Physics-Doklady, vol. 10, No. 8, Feb. 1966, pp. 707-710.

Fabian Pedregosa et al., "Scikit-learn: Machine learning in Python", Journal of machine learning Research 12 (2011) 2825-2830.

Robert A. Wagner and Michael J. Fischer., "The String-to-String Correction Problem", Journal of the Association for Computing Machinery, vol. 21, No. 1, Jan. 1974, pp. 168-173.

Indian Patent Office, Examination Report for Application No. 202117019368, mailed Dec. 12, 2022, 6 pages.

English Summary of Tao, Shaohui et al., A high sparseness least squares support vector machine classifier. Syst. Eng. Electron. 29, No. 8, 1353-1357 (2007).

* cited by examiner

← 300

1. make_node (data_set) { /* data_set is the current set of observations */
2. Node current_node  /* This is where we store information about the new node that we are adding to the tree */
3.
4. calculate the entropy of the labels in data_set
5. for each of input parameters in data_set:
6.     calculate the information gain with respect to the labels
7. select the input parameter with the highest information gain
8. designate the selected input parameter for current_node
9. remove the selected parameter from data_set
10. for each value v of the selected input parameter:
11.     create edge for v descending from current_node
12.     if (the label has a value of "yes" for all observations in data_set in which the selected parameter has a value of v):
13.         return (current_node as a leaf node designated "yes" connected to edge)
14.     if (the label has a value of "no" for all observations in data_set in which the selected parameter has a value of v):
15.         return (current_node as a leaf node designated "no" connected to edge)
16.     make_node (data_set)

FIG. 3

- 39 Plastics and articles thereof
  - 3901 Polymers of ethylene, in primary forms:
  - 3902 Polymers of propylene or of other olefins, in primary forms:
  - 3903 Polymers of styrene, in primary forms:
  - 3904 Polymers of vinyl chloride or of other halogenated olefins, in primary forms:
  - 3905 Polymers of vinyl acetate or of other vinyl esters, in primary forms; other vinyl poly
  - 3906 Acrylic polymers in primary forms:
  - 3907 Polyacetals, other polyethers and epoxide resins, in primary forms; polycarbonate
  - 3908 Polyamides in primary forms:
  - 3909 Amino-resins, phenolic resins and polyurethanes, in primary forms:
  - 391000000 Silicones in primary forms
  - 3911 Petroleum resins, coumarone-indene resins, polyterpenes, polysulfides, polysulfor
  - 3912 Cellulose and its chemical derivatives, not elsewhere specified or included, in prim
  - 3913 Natural polymers (for example, alginic acid) and modified natural polymers (for ex:
  - 3914 Ion-exchangers based on polymers of headings 3901 to 3913, in primary forms:

Step 1: Merge product names of all the products with 3901 as the first 4 digits of their HS-Code and store them in a file $T_p$.

Step 2: Remove punctuation and stopwords (set of words which don't carry useful information, such as: of, with, the, a, on, etc) and update $T_p$.

Step 3: Expand the acronyms and update $T_p$.

Step 4: Count the frequency of each words in $T_p$.

Step 5: Set the threshold as $t=0.5 \times F_{avg}$, where $F_{avg}$ is the average of all frequency counts computed in the previous step.

Step 6: Select the words with their frequency count larger than the threshold value t and store them in a separate file $BOW_p$.

Step 7: This $BOW_p$ is the P-File for HS-Code 3901.

1. Preprocessing: preprocess the product name of and tokenize it to obtain a set of words $S_w$
2. Initialize: net-match-score = 0
3. for w in $S_w$ do
4.     best-match-score = 0;
5.     for each word $w_b$ in an existing P-file do
6.         match-score = 1 - normalizedLevenshtein($w, w_b$);
7.         if match-score > best-match-score then
8.             best-match-score = match-score
9.         end
10.    end
11.    net-match-score += best-match-score
12. end

FIG. 10A

1. Preprocessing: preprocess the product name and tokenize it to obtain a set of words $S_w$
2. Initialize: net-match-score = 0
3. for w in $S_w$ do
4.     best-match-score = 0;
5.     best-weight = 1;
6.     for each word $w_b$ in an existing P-file do
7.         match-score = 1 - normalizedLevenshtein(w,$w_b$);
8.         if match-score > best-match-score then
9.             best-match-score = match-score;
10.            best-weight = weight($w_b$);
11.            //where weight($w_b$) is the weight of word $w_b$ in an existing P-file
12.     end
13.     net-match-score += (best-weight  best-match-score)
14. end
15. 
16. for each RegEx R in an existing P-file do
17.     pattern-match-score = compare(w,R);
18.     //pattern-match-score can be 0 (no match) or 1 (100% match)
19.     net-match-score += (1000  pattern-match-score)
20. end
21.

Algorithm to compute the net-match-score (or string-similarity score) of the product name and the P-file with weighted list of words and regular expressions.

FIG. 10B

Step 1: For each word in a P-file or C-file, determine its frequency count

Step 2: Identify $f_{min}$ and $f_{max}$ as minimum and maximum frequency counts within a file Step 3: Compute the weight (w) of each word using the following equation:

$w = 1 + (f_w - f_{min})/(f_{max} - f_{min})$

This will ensure that weight of each word will lie between 1 and 10. The weight indicates the significance level of the word, with the value of 1 indicating lowest significance level and the value of 10 indicating the highest significance level.

Step 4: Keywords suggested by experts are given weight-value of 5, 7 or 10 as per an expert's comment about their relevance level

FIG. 12A

```
chlorinated::1.03765690377
acetic::1.15062761506
butene::1.94142259414
ethylene::10.0
hexene::4.05020920302
ester::1.37656903766
acrylic::1.0
octene::5.66945606695
ethene::9.58577405858
ethenyl::1.22594142259
```

FIG. 12B

HS CLASSIFICATION
2000

COMPOSITION
INTENDED USE/APPLICATION OF PRODUCT
PHYSICAL PROPERTIES
    PHYSICAL STATE
    FLASHPOINT/FLAMMABILITY SOLID DATA
    BOILING POINT
    VAPOR PRESSURE
    PH
APPLIED CONDITION (TEMPERATURE, MOISTURE PRESENCE, ETC.)
PACKAGING SIZE
DIMENSION OF THE ARTICLE
MATERIAL OF CONSTRUCTION FOR THE ARTICLE

DANGEROUS GOODS CLASSIFICATION
2002

COMPOSITION
INTENDED USE/APPLICATION OF PRODUCT
MODE OF TRANSPORT (AIR, VESSEL, US ROAD, BRAZIL ROAD ETC)
PHYSICAL PROPERTIES
    PHYSICAL STATE
    FLASHPOINT/FLAMMABILITY SOLID DATA
    BOILING POINT
    VAPOR PRESSURE
    PH
ORAL, DERMAL, INHALATION TOXICITY DATA
CORROSIVE TO SKIN/ALUMINUM CORROSION DATA
POLYMERIZATION/ELEVATED TEMPERATURE DATA/ BURNING RATE SAPT VALUE
BEHAVIOR UPON CONTACT WITH AIR/WATER
OXIDIZING PROPERTIES
ENVIRONMENTAL DATA

EXPORT CONTROL CLASSIFICATION NUMBER CLASSIFICATION
2004

COMPOSITION (CAS NUMBER, FOR EXAMPLE)
INTENDED USE/APPLICATION OF PRODUCT, ESPECIALLY RELATE TO MILITARY USE OR DRUG PRECURSOR
DIMENSION OF THE ARTICLE
PHYSICAL STATE (FIBROUS MATERIAL)
PHYSICAL PROPERTY (GLASS TRANSITION TEMPERATURE, ETC.)

FIG. 20

EXAMPLE DECISION TREE FOR EXPORT CONTROL CLASSIFICATION NUMBER CLASSIFICATION 2100 a. Organic "fibrous or filamentary materials", having all of the following:
    a.1. "Specific modulus" exceeding $12.7 \times 10^6$ m; and
    a.2. "Specific tensile strength" exceeding $23.5 \times 10^4$ m;
b. Carbon "fibrous or filamentary materials", having all of the following:
    b.1. "Specific modulus" exceeding $14.65 \times 10^6$ m; *and*
    b.2. "Specific tensile strength" exceeding $26.82 \times 10^4$ m;
c. Inorganic "fibrous or filamentary materials", having all of the following:
    c.1. "Specific modulus" exceeding $2.54 \times 10^6$ m; *and*
    c.2. Melting, softening, decomposition or sublimation point exceeding 1,922 K (1,649 °C) in an inert environment;
d. "Fibrous or filamentary materials", having any of the following:
    d.1. Composed of any of the following:
        d.1.a. Polyetherimides controlled by 1C008.a; or
        d.1.b. Materials controlled by 1C008.d to 1C008.f; or
    d.2. Composed of materials controlled by 1C010.d.1.a or 1C010.d.1.b and "commingled" with other fibers controlled by 1C010.a, 1C010.b or 1C010.c;
e. Fully or partially resin-impregnated or pitch-impregnated "fibrous or filamentary materials" (prepregs), metal or carbon-coated "fibrous or filamentary materials" (preforms) or "carbon fiber preforms", having all of the following:
    e.1. Having any of the following:
        e.1.a. Inorganic "fibrous or filamentary materials" controlled by 1C010.c; or
        e.1.b. Organic or carbon "fibrous or filamentary materials", having all of the following:
            e.1.b.1. "Specific modulus" exceeding $10.15 \times 10^6$ m; *and*
            e.1.b.2 "Specific tensile strength" exceeding $17.7 \times 10^4$ m; *and*
    e.2. Having any of the following:
        e.2.a. Resin or pitch, controlled by 1C008 or 1C009.b;
        e.2.b. 'Dynamic Mechanical Analysis glass transition temperature (DMA Tg)' equal to or exceeding 453 K (180 °C) and having a phenolic resin; *or*
        e.2.c. 'Dynamic Mechanical Analysis glass transition temperature (DMA Tg)' equal to or exceeding 505 K (232 °C) and having a resin or pitch, not specified by 1C008 or 1C009.b, and not being a phenolic resin;

Non-fluorinated polymeric substances
a. Imides as follows:
    a.1. Bismaleimides;
    a.2. Aromatic polyamide-imides (PAI) having a 'glass transition temperature (Tg)' exceeding 563 K (290 °C);
    a.3. Aromatic polyimides having a 'glass transition temperature (Tg)' exceeding 505 K (232 °C);
    a.4. Aromatic polyetherimides having a 'glass transition temperature (Tg)' exceeding 563 K (290 °C);
d. Polyarylene ketones;
e. Polyarylene sulphides, where the arylene group is biphenylene, triphenylene or combinations thereof;
f. Polybiphenylenethersulphone having a 'glass transition temperature (Tg)' exceeding 563 K (290 °C).

FIG. 21

HYBRID MACHINE LEARNING MODEL FOR CODE CLASSIFICATION

PRIORITY

This application is a U.S. national phase of International Application No. PCT/US2019/050555, filed on Sep. 11, 2019, which claims priority to U.S. Provisional Application No. 62/738,482, filed Sep. 28, 2018, both of which are incorporated by reference herein in their entirety.

BACKGROUND

At the time of international trading or cross-border transaction, the product being traded undergoes the process of custom clearance. An appropriate tariff is imposed on it depending on its type, importing and exporting countries, application, etc. In order to make the process of imposing tariffs and duties more organized, the World Customs Organization (WCO) employs a coding scheme, based on which each product can be assigned to a particular code known as Harmonized Tariff Schedule Code (HTS or HS-Code for short). This code encompasses 8-12 digits depending on the importing-exporting country, with the first 6 digits consistent globally. For the United States, the HS-Code is 10 digits long. Proper designation of tariff codes for new and existing products is challenging even for an expert. Further, current semi-automated techniques lack accuracy while requiring some human intervention.

SUMMARY

The embodiments herein provide an improved technique for predicting an HS-Code of a product with a hybrid machine learning classifier. Particularly, the constituent chemical components of the products are used to predict, with high accuracy, a prefix of the HS-Code. Doing so involves using a trained random forest of decision trees. Additional chemical properties of the product are then used to predict the remaining part (the suffix) of the HS-Code. This aspect of the classification involves selecting and applying an expert tree to the additional properties. On average, the resulting full HS-Code can be predicted with greater than 95% accuracy using these embodiments.

The techniques described herein may also be used in general to predict HS-Codes of other types of products based on the constituent components, physical characteristics (e.g., size, shape, length, width, depth), source, manufacturing technique, market applications, packaging size, etc. of the products. Notably, any one or more chapters related to HS-Codes may employ embodiments similar to those herein. Furthermore, the techniques described herein may be used to predict other types of codes related to products or services, such as customs codes, import/export codes, commodity codes, duty codes, dangerous goods classifications, export control classification numbers (ECCNs), Globally Harmonized System Labeling Classification and so on.

Accordingly, a first example embodiment may involve obtaining, from a memory, a set of tariff code mappings and respective sets of suffix mappings, where the set of tariff code mappings are between chemical component descriptions and tariff codes, where the tariff codes comprise tariff code prefixes and tariff code suffixes, and where each of the tariff code prefixes is associated with a respective set of suffix mappings between properties related to the chemical component descriptions and the tariff code suffixes. The first example embodiment may also involve, for each respective prefix of the tariff code prefixes, generating, from the set of tariff code mappings, a component file that contains names of chemical components in the chemical component descriptions that map to the respective prefix. The first example embodiment may also involve, for each respective description of the chemical component descriptions: (i) determining a dominant chemical component, (ii) determining a proportion of the dominant chemical component in comparison to other chemical components in the respective description, (iii) for each respective file of the component files, calculating similarity scores for the respective description by determining edit distances between words in the respective description and words in the respective file, and (iv) generating a feature vector for the respective description from the proportion of the dominant chemical component and the similarity scores. The first example embodiment may also involve training a random forest of decision tree classifiers with the feature vectors for the respective descriptions as input and the tariff code prefixes for the respective descriptions as output labels. The first example embodiment may also involve, for each respective prefix of the tariff code prefixes, constructing a respective expert tree mapping from the set of suffix mappings for the respective prefix, where traversal of the expert tree in accordance with the properties related to the chemical component descriptions leads to a particular tariff code suffix specified in the set of suffix mappings, and where a hybrid machine learning classifier uses the random forest and the expert trees to predict the tariff codes.

A second example embodiment may involve obtaining, from a memory, a set of tariff code mappings between chemical component descriptions and tariff codes, where the tariff codes comprise tariff code prefixes and tariff code suffixes. The second example embodiment may also involve, for each respective description of the chemical component descriptions, generating a feature vector for the respective description from: (i) a proportion of a dominant chemical component, and (ii) similarity scores between the respective description and sets of words respectively associated with the tariff codes. The second example embodiment may also involve training a random forest of decision tree classifiers with the feature vectors for the respective descriptions as input and the tariff code prefixes for the respective descriptions as output labels. The second example embodiment may also involve, for each respective prefix of the tariff code prefixes, constructing a respective expert tree mapping from the respective descriptions to the tariff code suffixes of the respective prefix, where a hybrid machine learning classifier uses the random forest and the expert trees to predict the tariff codes.

A third example embodiment may involve obtaining a new set of chemical components, where access is available to: (i) a hybrid machine learning classifier, where the hybrid machine learning classifier uses a random forest of decision tree classifiers to predict a tariff code prefix from an input feature vector, where the hybrid machine learning classifier uses a plurality of expert trees, one for each of the tariff code prefixes, to predict a tariff code suffix from properties related to chemical components associated with the respective tariff code prefix, and (ii) a plurality of component files, one for each of the tariff code prefixes, that contain names of chemical components associated with the respective tariff code prefix. The third example embodiment may also involve determining, from the new set of chemical components, a dominant chemical component. The third example embodiment may also involve determining a proportion of the dominant chemical component in comparison to other chemical components in the new set of chemical components. The third example embodiment may also involve, for each respective file of the plurality of component files, calculating similarity scores for the new set of chemical components by determining edit distances between words used to describe the new set of chemical components and words in the respective file. The third example embodiment may also involve generating a feature vector for the new set of chemical components from the proportion of the dominant chemical component and the similarity scores. The third example embodiment may also involve obtaining a predicted tariff code prefix by applying the random forest of decision tree classifiers to the feature vector. The third example embodiment may also involve selecting, from the plurality of expert trees, a particular expert tree associated with the predicted tariff code prefix. The third example embodiment may also involve obtaining a predicted tariff code suffix by traversing the particular expert tree in accordance with the properties related to the new set of chemical components. The third example embodiment may also involve generating a tariff code for the new set of chemical components by concatenating the predicted tariff code prefix and the predicted tariff code suffix.

A fourth example embodiment may involve obtaining a new set of chemical components, where access is available to a hybrid machine learning classifier, where the hybrid machine learning classifier uses a random forest of decision tree classifiers to predict a tariff code prefix from an input feature vector, where the hybrid machine learning classifier uses a plurality of expert trees, one for each of the tariff code prefixes, to predict a tariff code suffix from properties related to chemical components associated with the respective tariff code prefix. The fourth example embodiment may also involve determining, from the new set of chemical components, a proportion of a dominant chemical component in comparison to other chemical components in the new set of chemical components. The fourth example embodiment may also involve calculating similarity scores for the new set of chemical components by determining edit distances between words used to describe the new set of chemical components and words associated with the tariff code prefixes. The fourth example embodiment may also involve generating a feature vector for the new set of chemical components from the proportion of the dominant chemical component and the similarity scores. The fourth example embodiment may also involve obtaining a predicted tariff code, where a predicted tariff code prefix of the predicted tariff code is determined by applying the random forest of decision tree classifiers to the feature vector, where a predicted tariff code suffix of the predicted tariff code is determined by traversing a particular expert tree in accordance with the properties related to the new set of chemical components, and where the particular expert tree is associated with the predicted tariff code prefix.

In a fifth example embodiment, a method may be used to perform operations in accordance with the first, second, third, and/or fourth example embodiment.

In a sixth example embodiment, an article of manufacture may include a non-transitory computer-readable medium, having stored thereon program instructions that, upon execution by a computing system, cause the computing system to perform operations in accordance with the first, second, third, and/or fourth example embodiment.

In a seventh example embodiment, a system may include various means for carrying out each of the operations of the first, second, third, and/or fourth example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 depicts pseudocode for recursively building a decision tree, in accordance with example embodiments.

FIG. 5 depicts the first 14 subheadings the U.S. version of the Harmonized Tariff Schedule Code, Chapter 39, in accordance with example embodiments.

FIG. 8A depicts pseudocode for generating a P-file for products, in accordance with example embodiments.

FIG. 10A depicts pseudocode for determining a match score between a product description and a P-file for products, in accordance with example embodiments.

FIG. 10B depicts pseudocode using regular expressions for determining a match score between a product description and a P-file for products, in accordance with example embodiments.

FIG. 12A depicts pseudocode for determining a weight for a word based on the frequency of the word, in accordance with example embodiments.

FIG. 12B depicts words and their associated weights, in accordance with example embodiments.

FIG. 20 is a listing of properties potentially relevant to classification, in accordance with example embodiments.

FIG. 21 is an example decision tree for export control classification numbers, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Computing Devices and Cloud-Based Computing Environments

The following embodiments describe architectural and operational aspects of example computing devices and systems that may employ the disclosed implementations, as well as the features and advantages thereof.

Figure 1:
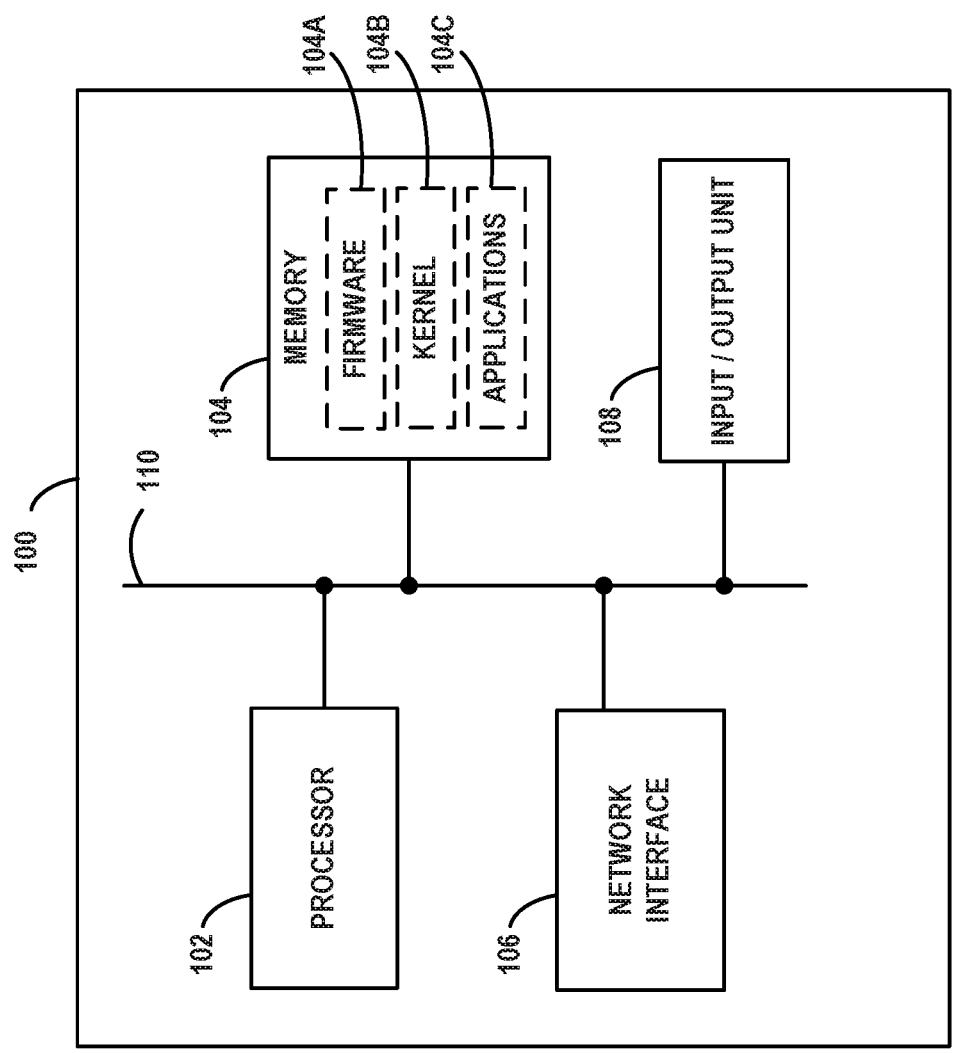
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples. Computing device 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (WI-FI®), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and WI-FI® interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
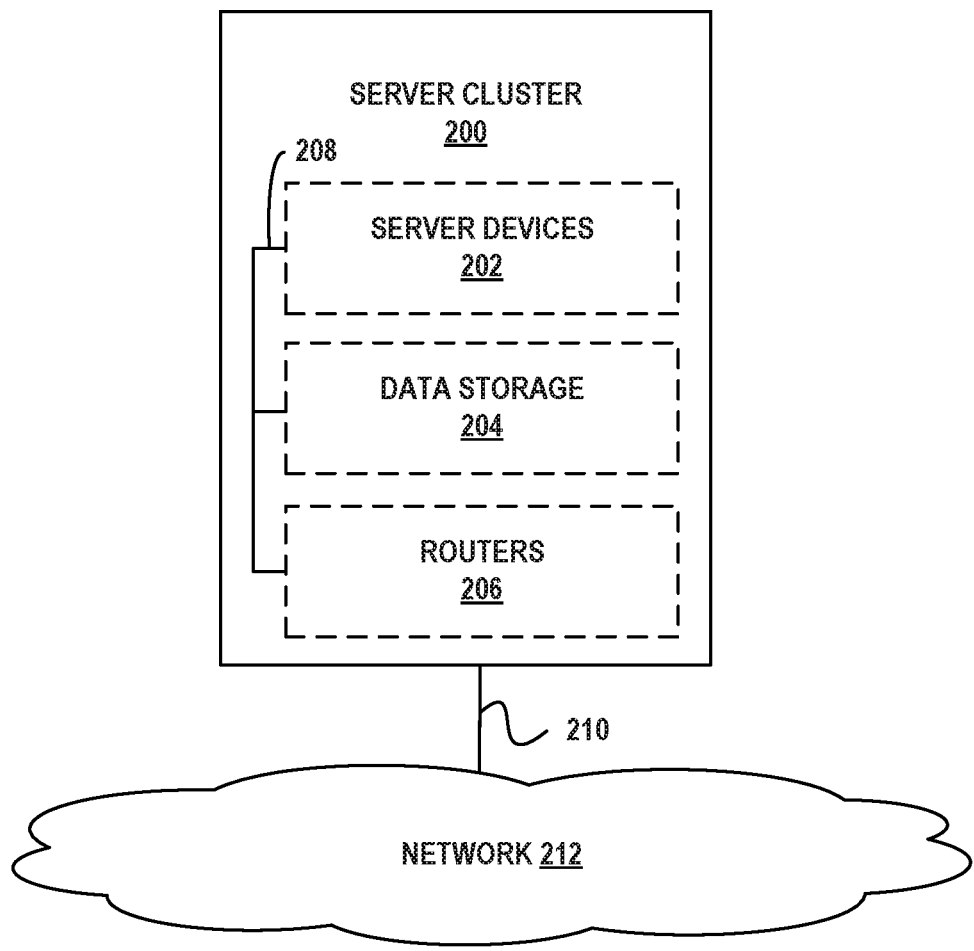
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based, at least in part, on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Python, PHP Hypertext Preprocessor (PHP), Active Server Pages (ASP), JavaScript, and/or other languages such as C++, C #, or Java. Computer program code written in these languages may facilitate the providing of web pages to client devices, as well as client device interaction with the web pages.

II. Decision Trees and Random Forests

A decision tree is a type of machine learning classifier that takes input with one or more parameters and predicts a label with which the input is associated. As suggested by its name, a decision tree is embodied in a tree-like form, with non-leaf nodes representing decisions to be made based on values of the input parameters. Edges from a non-leaf node to its children represent possible values or ranges of values of the input parameter associated with the non-leaf node. A leaf node represents a predicted label when the input parameters have values represented by the path from the root to the leaf node.

A decision tree is trained by a corpus of data in which the mappings between the input parameters (observations) and the label is known. This training process builds a decision tree that is expected to predict the label of new observations with a reasonable degree of accuracy.

Random forests are ensemble learning techniques that build two or more decision trees for a given data set and output the label that is most frequently produced by these decision trees, or is some form of average of the labels produced by the decision trees.

A. Example Decision Tree

The following is an illustrative example of a decision tree. While this example provides one possible approach for training and building a decision tree, other approaches may be used.

TABLE 1

| Observation | Outlook | Temperature | Humidity | Wind | Golf? |
|---|---|---|---|---|---|
| 1 | Sunny | Hot | High | Weak | No |
| 2 | Sunny | Hot | High | Strong | No |
| 3 | Overcast | Hot | High | Weak | Yes |
| 4 | Rain | Mild | High | Weak | Yes |
| 5 | Rain | Cool | Normal | Weak | Yes |
| 6 | Rain | Cool | Normal | Strong | No |
| 7 | Overcast | Cool | Normal | Strong | Yes |
| 8 | Sunny | Mild | High | Weak | No |
| 9 | Sunny | Cool | Normal | Weak | Yes |
| 10 | Rain | Mild | Normal | Weak | Yes |
| 11 | Sunny | Mild | Normal | Strong | Yes |
| 12 | Overcast | Mild | High | Strong | Yes |
| 13 | Overcast | Hot | Normal | Weak | Yes |
| 14 | Rain | Mild | High | Strong | No |

Table 1 provides 14 observations of weather conditions (outlook, temperature, humidity, and wind) as well as whether a decision was made to play golf under those conditions. For instance, in observation 1 the outlook was sunny, the temperature was hot, the humidity was high, and the wind was weak. Under these conditions, a decision was made not to play golf. On the other hand, in observation 4, the outlook was rain, the temperature was mild, the humidity was high, and the wind was weak. Under these conditions, a decision was made to play golf. These observations reflect a preference to play golf when it is not raining, the temperature is mild, the humidity is normal, and the wind is weak. No one of these weather conditions, however, is guaranteed to be determinative. Thus, one might decide to play golf in non-ideal, but acceptable, weather conditions.

Each of the observations in Table 1 associates input parameters (the weather conditions for outlook, temperature, humidity, and wind) and a label (whether to play golf). In Table 1 and the following tables that represent observations, the column with the label is italicized. These observations can be used to train (build) a decision tree. But in order to do so, a quick diversion into a few equations may be helpful. These equations can be used to determine which non-leaf nodes in the decision tree get associated with which input parameters.

Entropy is a measure of the amount of uncertainty, or randomness, in a data set. Given such a data set, S, the entropy, H(S), is calculated as $$H(S) = \sum_{s \in S} p(s) \log_2 \frac{1}{p(s)}$$

The variable s represents the values that can be taken on by the data set S. An entropy of 0 means that all values are the same. As entropy increases toward 1, the values are more and more random.

Regarding a data set with input parameters and a label, such as the data set of Table 1, information gain for a given input parameter is defined to be the total entropy for the given input parameter if a classification is made to a fixed label. Thus, the information gain, IG(X, Y), associated with label set X and input parameter Y is calculated as $$IG(X, Y) = H(X) - \sum_{y \in Y} p(y) H(X \mid y)$$

The variable γ represents the values that can be taken on by the input parameter Y, and H(X) is entropy of X. The term H(X|γ) is the conditional entropy of the labels if input parameter Y takes on a value of γ. Intuitively, the information gain represents how much input parameter contributes to the entropy, H(X), of the label set X.

In FIG. 3, an example recursive function, make_node( ) for building a decision tree. is shown in pseudocode 300. As shown in pseudocode 300, make_node( ) takes one parameter—the current data set of observations. Using the data in Table 1, this function and the equations described above can be illustrated.

The following discussion applies this procedure to the data set of Table 1. At step 1, make_node( ) is called with the entire data set and root node is created. At step 4, the entropy of each of the labels ("yes" and "no") is calculated as $$H(X) = \sum_{x \in X} p(x) \log_2 \frac{1}{p(x)} = \left(\frac{9}{14}\right) \log_2 \left(\frac{14}{9}\right) + \left(\frac{5}{14}\right) \log_2 \left(\frac{14}{5}\right) = 0.940$$

At steps 5-6, the information gain for each input parameter (outlook, temperature, humidity, wind) is determined. Starting with wind, the calculation is $$IG(X, \text{wind}) = H(X) - \sum_{y \in \text{wind}} p(y) H(X \mid y)$$

Since H(X) is known, only the second term needs to be determined. Here, wind is either weak or strong. The probabilities of each are readily obtained from Table 1, and are p(weak)=8/14 and p(strong)=6/14.

Out of the 8 observations with weak wind, 6 have a label of "yes" while two have a label of "no". Out of the 6 observations with strong wind, 3 have a label of "yes" and three have a label of "no". Consequently $$H(X \mid \text{weak}) = \left(\frac{6}{8}\right) \log_2 \left(\frac{8}{6}\right) = 0.811$$

And $$H(X \mid \text{strong}) = \left(\frac{3}{6}\right) \log_2 \left(\frac{6}{3}\right) = 1.0$$

Therefore $$IG(X, \text{wind}) = 0.940 - \left(\frac{8}{14}\right)(0.811) - \left(\frac{6}{14}\right)(1.0) = 0.048$$

Carrying out these calculations for the other three input parameters results in

IG(X,outlook)=0.246

IG(X,temperature)=0,029

IG(X,humidity)=0.151

At step 7, the input parameter with the highest information gain is selected. With the current set of observations, the information gain for outlook is the highest. Thus, at step 8, this input parameter is designated for the current node and then, at step 9, removed from the data set. At step 10, make_node iterates over all possible values of the selected parameter. For outlook, these are sunny, overcast, and rain. At step 11, an edge descending from the current node is created for each of these values.

Steps 12-15 involve determining whether any of these edges will terminate at a leaf node. This happens when all remaining observations in data_set have a label that is fully determined by the value of the selected input parameter. Looking back at Table 1, whenever the outlook takes on a value of overcast, the label is "yes". Therefore, in accordance with steps 12 and 13, current_node is returned as a leaf node designated "yes" and connected to the edge for overcast.

Neither of the other values of the selected input parameter can be used to unambiguously determine the label. Thus, make_node( ) is called again for each of these values, with data_set passed as modified in step 9.

Figure 4A:
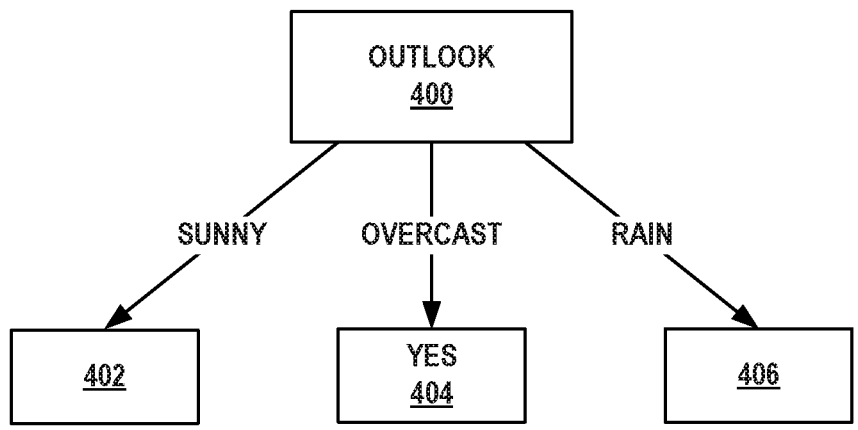
FIG. 4A depicts a partial decision tree, in accordance with example embodiments.

The resulting partial tree is shown in FIG. 4A. Node 400 (the root node) is designated with outlook. Edges for each possible value of outlook (sunny, overcast, and rain) are represented as descending from node 400 to nodes 402, 404, and 406.

TABLE 2

| Observation | Outlook | Temperature | Humidity | Wind | Golf? |
|---|---|---|---|---|---|
| 1 | Sunny | Hot | High | Weak | No |
| 2 | Sunny | Hot | High | Strong | No |
| 8 | Sunny | Mild | High | Weak | No |
| 9 | Sunny | Cool | Normal | Weak | Yes |
| 11 | Sunny | Mild | Normal | Strong | Yes |

As noted above, make_node( ) is recursively called for node 402. Only observations for which the outlook is sunny will be considered, and these are represented as Table 2. The entropy of the labels is calculated as $$H(X_{sunny}) = \sum_{x \in X_{sunny}} p(x)\log_2 \frac{1}{p(x)} = \left(\frac{3}{5}\right)\log_2\left(\frac{5}{3}\right) + \left(\frac{2}{5}\right)\log_2\left(\frac{5}{3}\right) = 0.960$$

Then, the information gains for each of the remaining input variables (humidity, temperature, and wind) are calculated to be $IG(X_{sunny},\text{humidity})=0.960$ $IG(X_{sunny},\text{temperature})=0.570$ $IG(X_{sunny},\text{wind})=0.019$ Since humidity has the highest information gain, it will be chosen as the designation for node 402. Note that the value for humidity also determines the label at node 402—if the humidity is high, the label is "no" while if the humidity is normal, the label is "yes".

TABLE 3

| Observation | Outlook | Temperature | Humidity | Wind | Golf? |
|---|---|---|---|---|---|
| 4 | Rain | Mild | High | Weak | Yes |
| 5 | Rain | Cool | Normal | Weak | Yes |
| 6 | Rain | Cool | Normal | Strong | No |
| 10 | Rain | Mild | Normal | Weak | Yes |
| 14 | Rain | Mild | High | Strong | No |

The function make_node is also recursively called for node 406. Only observations for which the outlook is rain will be considered. This is represented in Table 3. The entropy of the labels is identical to that of Table 2 (three "yes" labels, two "no" labels), so $$H(X_{rain}) = \sum_{x \in X_{rain}} p(x)\log_2 \frac{1}{p(x)} = \left(\frac{3}{5}\right)\log_2\left(\frac{5}{3}\right) + \left(\frac{2}{5}\right)\log_2\left(\frac{5}{3}\right) = 0.960$$

Then, the information gains for each of the remaining input variables (humidity, temperature, and wind) are calculated to be $IG(X_{rain},\text{humidity})=0.526$ $IG(X_{rain},\text{temperature})=0.526$ $IG(X_{rain},\text{wind})=0.960$ Since wind has the highest information gain, it will be chosen as the designation for node 406. Note that the value for wind also determines the label at node 406—if the wind is weak, the label is "yes" while if the wind is strong, the label is "no".

Figure 4B:
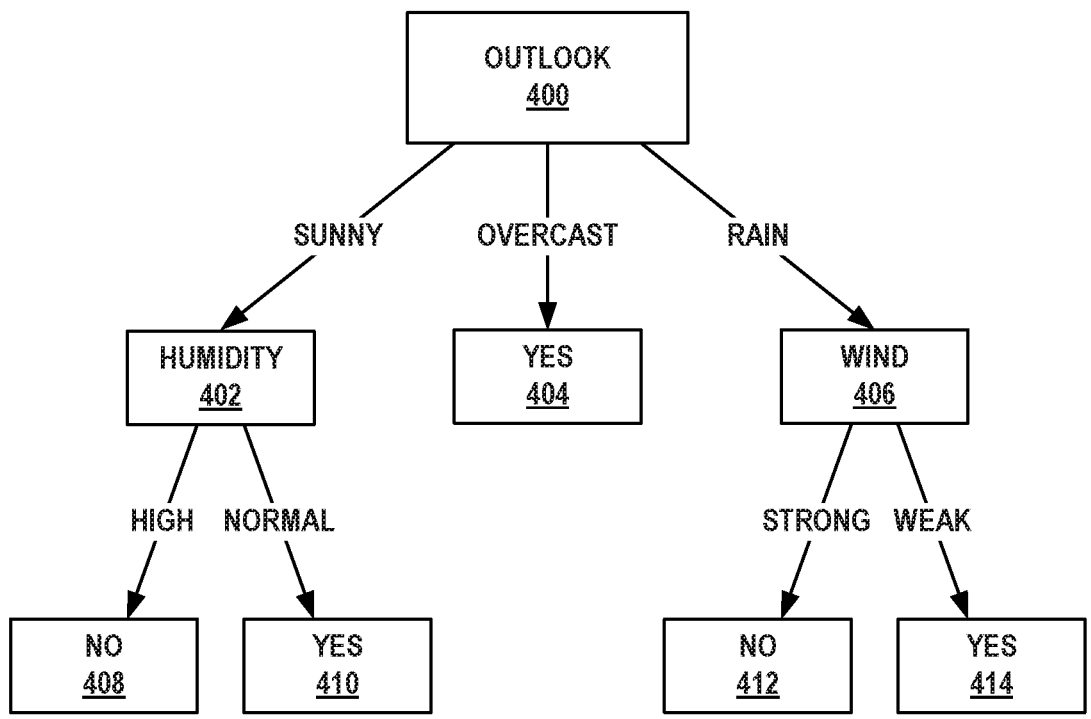
FIG. 4B depicts a complete decision tree, in accordance with example embodiments.

The resulting final decision tree is shown in FIG. 4B. Nodes 408 and 410 have been added as leaf nodes to node 402, and nodes 412 and 414 have been added as leaf nodes to node 406. Since all possible paths end in leaf nodes, the decision tree training is complete.

The decision tree of FIG. 4B can be used to predict a label associated with a given set of input parameters. For example, suppose that the current weather conditions are a sunny outlook, mild temperature, normal humidity, and weak wind. Applying this decision tree, to these conditions, one would first consider the outlook at node 400. Since the outlook is sunny, one would follow the edge designated as sunny to node 402. Then, one would consider the humidity. Since the humidity is normal, one would follow the edge designated as normal to node 410. Based on this path through the decision tree, the conclusion would be to play golf. In other words, for a new set of weather conditions that were not explicitly considered in building the decision tree, the decision tree is still able to predict a label that is likely to be the desired outcome.

It should be noted that the make_node( ) function of FIG. 3 is just one possible algorithm for building a decision tree. Other algorithms such as C4.5, classification and regression tree (CART), Chi-squared automatic interaction detector (CHAID), and multivariate adaptive regression splines (MARS) may be used. Furthermore, other techniques to select input parameters other than information gain may be used, such Gini impurity or variance reduction.

B. Example Random Forests

While decision trees are robust predictors of labels, they can suffer from overfitting their data sets. Random forests are a way of considering the output of multiple decision trees that are trained on different parts of the same data set. This approach may reduce the variance associated with the over-rating, and in practice has been observed to produce better results than decision trees alone.

Particularly, in a data set of n observations, i subsets of j observations each may be selected. These subsets may be selected with replacement. Then, a decision tree is built for each subset of observations. This effectively de-correlates the decision trees. Some or all of these decision trees are applied to a new observation to produce i predicted labels. As noted above, a mode or an average of these labels may be taken to produce a final predicted label. Due to their de-correlated nature, even if each individual decision tree is sensitive to noise, the random forest thereof is much less sensitive.

In some embodiments, building a random forest may involve a modified version of make_node( ) that selects, at each non-leaf node, a random subset of input parameters to consider. If a small number of input parameters are strong predictors of the label, these input parameters appear early (higher) in many decision trees. Thus, randomizing the input parameters further de-correlates the trees.

III. Tariff Codes and Their Determination

At the time of international trading or cross-border transaction, the product being traded undergoes the process of custom clearance. An appropriate tariff is imposed on it depending on its type, importing and exporting countries, application, etc. In order to make the process of imposing tariff/duties more organized, the WCO employs a coding scheme, based on which each product can be assigned to a particular code known as a Harmonized Tariff Schedule Code (HS-Code), This code encompasses 8-12 digits depending on the importing-exporting country, with the first 6 digits consistent globally. For United States, the HS-Code is 10 digits long. In the embodiments herein, a goal is to accurately predict the 10-digit, U.S.-based HS-Codes for chemical-polymers of Chapter 39, which includes the first 14 subheadings 500 of Chapter 39, as shown in FIG. 5.

TABLE 4

| Heading | Subheading | Suffix | Description |
|---------|------------|--------|-------------|
| 3901 | 10 | 1000 | Polyethylene having a specific gravity of less than 0.94; having a relative viscosity of 1.44 or more. |
| 3901 | 10 | 5010 | Polyethylene having a specific gravity of less than 0.94; linear low density polyethylene. |
| 3901 | 10 | 5020 | Polyethy lene having a specific gravity of less than 0.94; low density polyethylene, except linear low density polyethylene. |
| 3901 | 10 | 5030 | Polyethylene having a specific gravity of less than 0.94; medium density polyethylene. |
| 3901 | 20 | 1000 | Polyethylene having a specific gravity of 0.94 or more; having a relative viscosity of 1.44 or more. |
| 3901 | 20 | 5000 | Polyethylene having a specific gravity of 0.94 or more; other. |

Tariff codes have a tree-like structure. For instance, in Chapter 39, the heading 3901 refers to polymers of ethylene, in primary forms. The heading/subheading pair 390110 refers to polyethylene having a specific gravity of less than 0.94, while the heading/subheading pair 390120 refers to polyethylene having a specific gravity of 0.94 or more. Further subheadings and static suffixes are used to define more specific product components under this rubric. As an example, several 10-digit HS-Codes under heading 3901 are shown in Table 4.

In order to determine these codes, products are classified based on their respective names, component lists, and/or other descriptive information. Currently, this classification is carried out manually, often by human experts. These manual processes are ontology based, where an expert navigates through a sequential set of organized questions using a query based interface to eventually determine the HS-Code of a given product. Other approaches include use of the existing knowledge base from previous classification data. A new product is then compared with these historical classifications and is assigned a HS-Code based on the best-matched product from the knowledge base. There have been proposals to break down the total product information into a set of keywords and recommend list of HS-Codes by implementing a lookup module, as well as to use power-mean support vector-machines and an ad-hoc rule based system to predict the HS-Code.

But all of these approaches have the drawback of not being fully automated (i.e., they require some form of human input). Beyond that, they are still error prone, as even experts can fail to apply the proper rules in all situations, and thus an accuracy of 95% or more is difficult to attain consistently, especially for new products. As a consequence, many industrial and technological processes suffer due to the delay associated with determining a tariff code, as well as from a significant portion of these determined tariff codes being incorrect.

IV. Machine Learning Implementation

Figure 6:
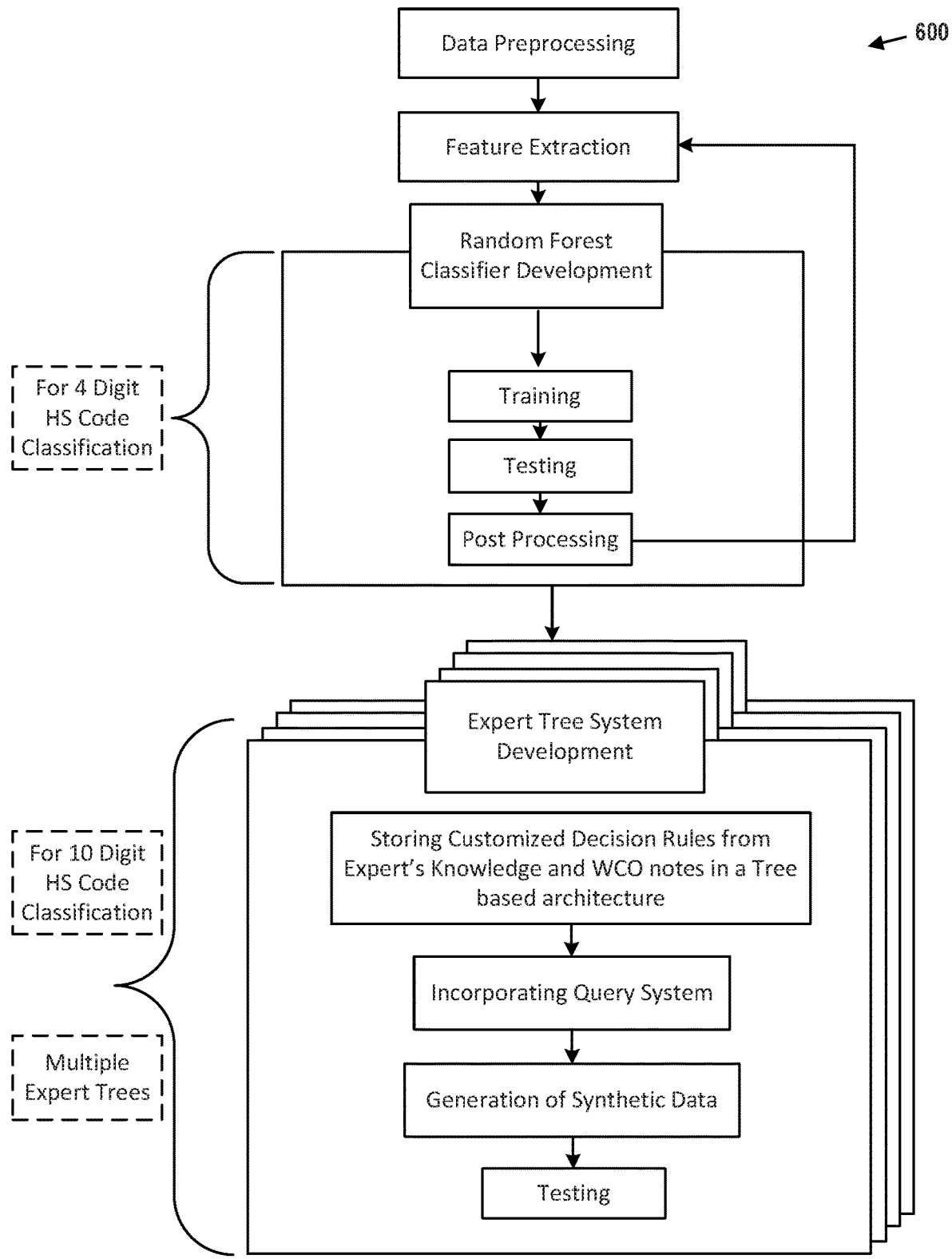
FIG. 6 is a flow chart, in accordance with example embodiments.

The embodiments herein predict tariff codes with autonomous classification and reduction (or removal) of manual intervention. In particular, a machine learning based technology processes product information and assigns an appropriate HS-Code. A natural Language Processing (NLP) based feature-vector generator extracts important attributes (or features) from the supplied product data, which then serves as an input to a hybrid random forest and expert tree based classification system to predict the HS-Code. An overall framework for this system is schematically represented in flow chart 600 of FIG. 6. Notably, the embodiments herein provide a new technique for predicting tariff codes that has not previously been employed manually, and that provides accuracies that are consistently, exceeding 95%.

More specifically, the embodiments herein involve five main phases: pre-processing, feature vector generation, training, testing, and post-processing. Each of these phases is discussed in turn below.

A. Pre-Processing

The pre-processing stage comprises of filtering and organizing the supplied data to make it more systematic and structured. For chemical products, it involves normalization of component proportions after removing the solvent, representation of component proportions in consistent units, expansion of acronyms, determining co-monomer ratio of co-polymers, etc. During the pre-processing stage, each product is stored as an object with the attributes of product name, product specification-number, component ids, component proportions, component names, and component Chemical Abstracts Service (CAS) numbers.

B. Feature Vector Generation

Figure 7:
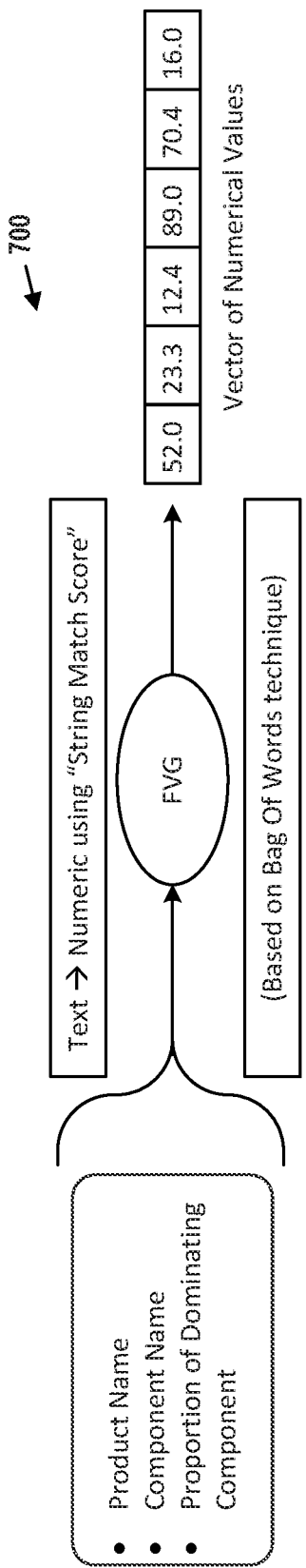
FIG. 7 depicts generating a feature vector from product information, in accordance with example embodiments.

Once the data is organized, it is then provided to the next stage of the overall machine learning process, which is feature vector generation. A feature vector is a representation of a product in which the product information is stored as a vector of numerical values. As mentioned previously, the product information data comprises textual information in terms of product name and component names, and numeric information in terms of component proportions (other information such as component CAS number may be used in the later stage of algorithm development). The task of a feature vector generator is to process this information and map it to a vector in an n-dimensional space. This is conceptually represented in diagram 700 of FIG. 7. The resulting feature vector is used, perhaps along with additional information, as input to a random forest of decision trees.

The first step to convert textual data into numbers is to establish a reference set which can be used as a basis of comparison while computing a string-similarity score (explained in the next subsection). A reference set of a textual data such as an article, blog entry, or description of a product comprises of keywords which represent that textual data. Each HS-Code has its own representative reference set of keywords, which is derived from the textual information affiliated with that particular HS-Code. For each HS-Code, two files of representative reference sets of keywords may be created, one using text from product names and another using text from component names. These files are called the bag-of-words (BOW) file for products (or P-file in short) and the BOW file for components (or C-file in short), respectively. The procedure to construct the P-file for code 3901 is explained in pseudocode 800 as shown in FIG. 8A.

Figure 8B:
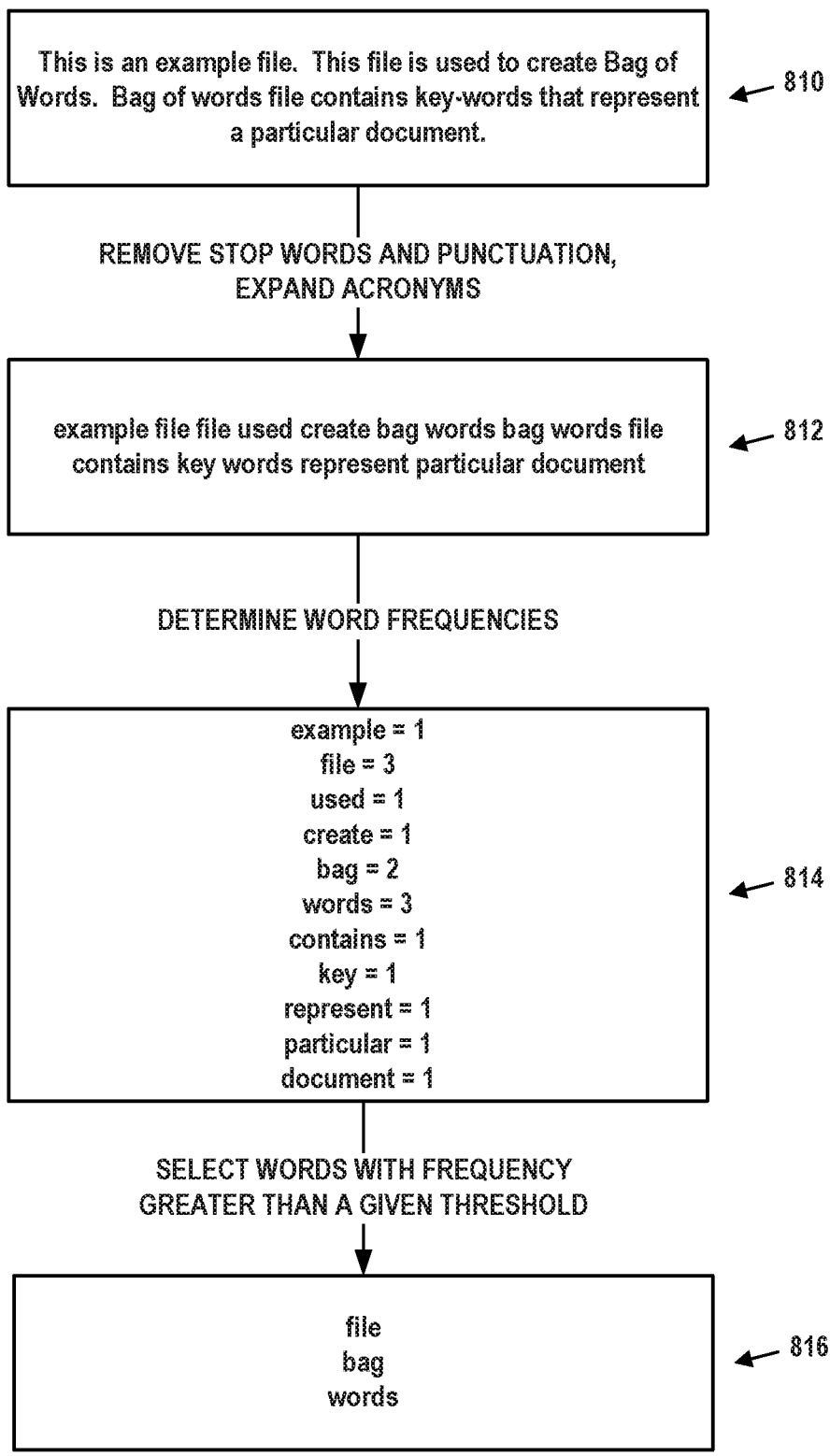
FIG. 8B depicts a simple example of generating a P-file using the pseudocode of FIG. 8A, in accordance with example embodiments.

FIG. 8B illustrates the mechanics of constructing a P-file in accordance with pseudocode 800. Note that this simple example begins with the text of block 810 as input for purpose of simplicity, though in practice product information would be used instead.

At step 1 of pseudocode 800, textual data is obtained by aggregating a number of product names, for example, into file $T_p$. At steps 2 and 3, stop-words (e.g., 'this', 'is', 'ad', 'to', 'of', 'that' and 'a') and punctuation marks are removed, and any acronyms are expanded. As shown in FIG. 8B, block 810 becomes block 812 after steps 2 and 3.

At step 4, the frequency of each word remaining in file $T_p$ is counted. This is represented in block 814. At step 5, the average of these frequencies, $f_{avg}$ is determined. For the word frequencies in block 814, $f_{avg}$ is 1.45. At steps 6 and 7, words with a frequency greater than the threshold $f_{avg}$ are selected as the representative keywords and stored in the P-file. In some cases, a non-negative, non-zero gain r may be applied to $f_{avg}$ so that $f_{avg}$ becomes higher or lower. For the example of FIG. 8B, the selected words are shown in block 816.

Figure 8C:
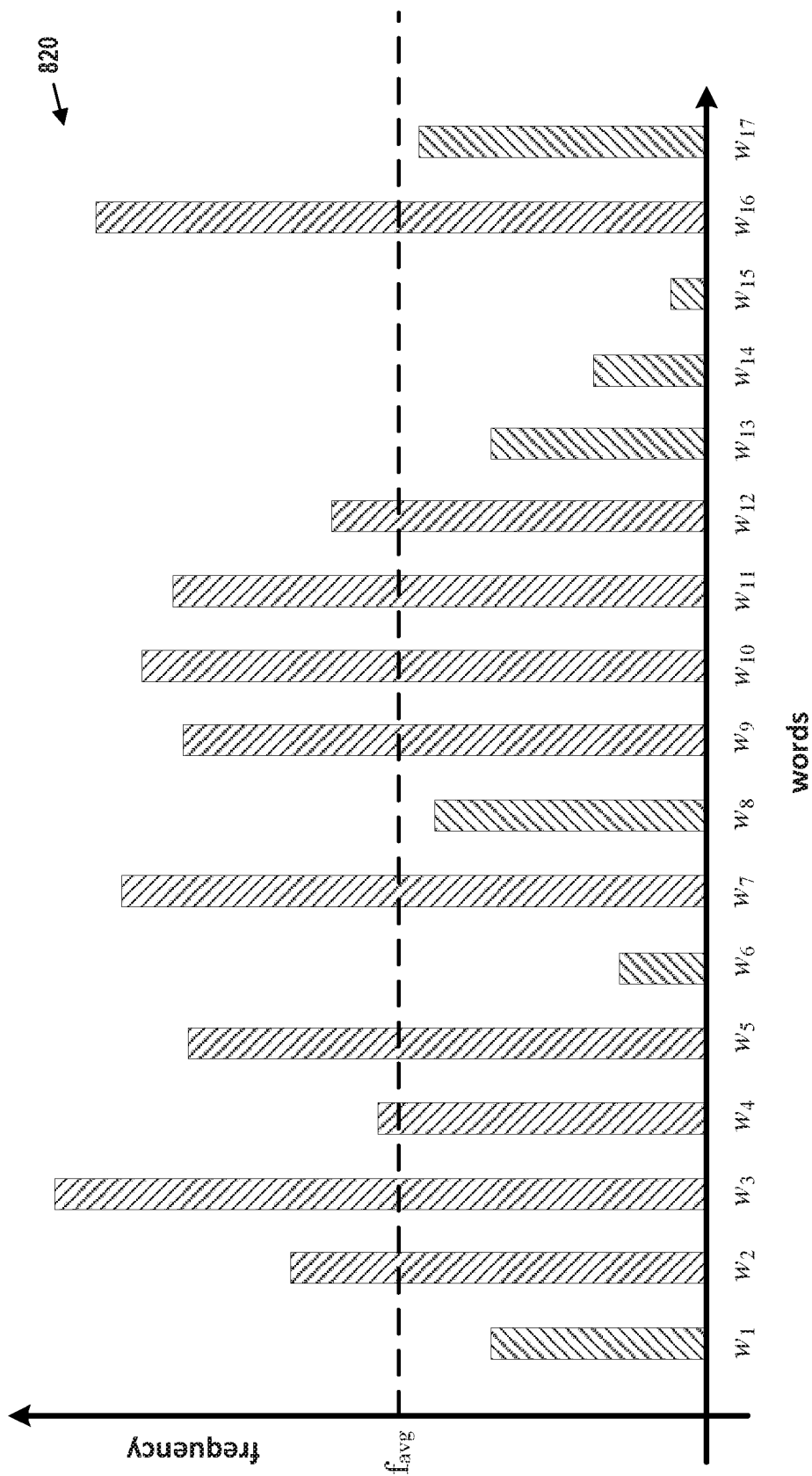
FIG. 8C depicts an example word frequency chart, in accordance with example embodiments.

FIG. 8C depicts another (different) example of selecting words for the P-file based on overall word frequencies. In FIG. 8C, bar chart 820 depicts the frequencies of 17 words, $w_1 \ldots w_{17}$. In particular, bar chart 820 plots words on the x-axis and their corresponding frequency on the y-axis. After removal of stop words and expansion of acronyms, suppose that a document has 17 words: w1, w2, . . . , w17. The frequency of each of 10 of these words is larger than the threshold frequency ($f_{avg}$, is represented with a horizontal dashed line in FIG. 8C). Thus, these 10 words are considered to be representative keywords for the source text document, and are thus stored in the P-file for this document.

In the embodiments herein, a P-file is generated for each 4-digit HS-Code prefix in Chapter 39 based on historical data. Additionally, a C-file, based on one or more names of components in the product, is also generated for each HS-Code prefix using the same or a similar process as that used to generate P-files, but using the text from the names of constituent chemical components of the product. For a new product being classified, a feature vector of numerical values is created with one (or two) elements per HS-Code prefix by using respective P-file and/or C-file of the HS-code prefix under consideration.

Figure 9:
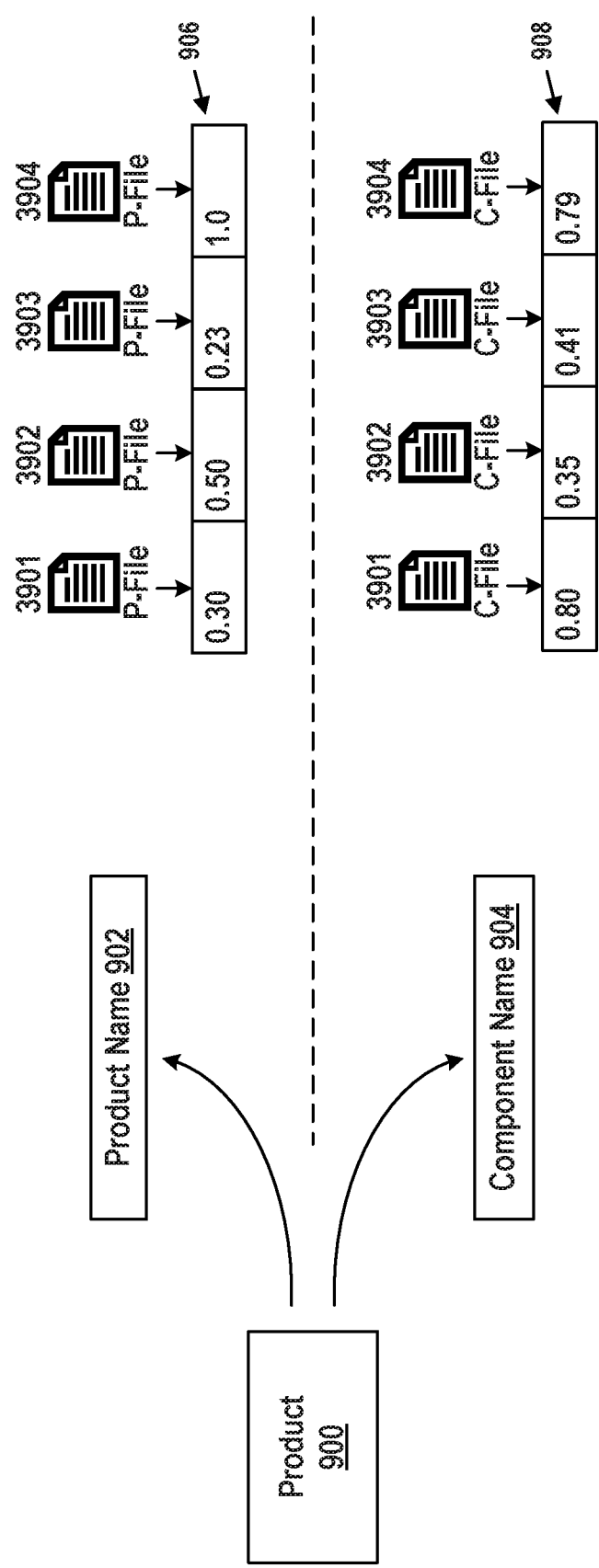
FIG. 9 depicts generation of a feature vector, in accordance with example embodiments.

An overview of this process is illustrated in FIG. 9. For a given product 900, product name 902 and component name 904 are derived. The component name 904 may be a dominating component name, in that it is the name of the component which has the maximum proportion of all the components used in product. Alternatively, more than one component name may be used. The derived product name is compared with the words in the P-file for each HS-Code prefix, while the derived component name is compared with the words in the C-file for each HS-Code prefix. The outcome of each comparison is a number that is stored in an element of the feature vector. For the 14 HS-Code prefixes of Chapter 39 (3901-3914), the feature vector can have 14 or 28 elements, one or two per HS-Code prefix. Abbreviated examples of the P-file vector 906 and the C-file vector 908 are shown in FIG. 9.

These comparisons, which result in the conversion of texts to numbers, are done by calculating a normalized version of the Levenshtein distance (an edit distance) between the text from the product names or component names of the product being classified, and the P-file and/or C-file of each of the 14 HS-Code prefixes. The Levenshtein distance between a first string and a second string is the number of deletions, insertions, substitutions required to transform the first string into the second string. For a perfect match (i.e., when the two strings being compared are identical), the Levenshtein distance value will be 0. The maximum value that the Levenshtein distance metric can have is the string length of the longest string under comparison. In the embodiments herein, the Levenshtein distance score is normalized by dividing it by the string length of the longest string of those being compared. The match score is then computed as the normalized Levenshtein distance subtracted from 1. Thus, the normalized match score can be between 0 and 1, inclusive, with a higher value indicating a better match.

FIG. 10A depicts pseudocode 1000 for determining the net-match-score between a product name and one of the P-files. In short, the normalized match-scores between each word (w) in the product name of a product and words ($w_b$) in the P-file, are computed to determine the best-matching word ($w_b^*$) in the P-file. Let's call the match-score between w and the corresponding $w_b^*$ the "best-match-score". The values of these "best-match-scores" for each of the words (w) in the product name are summed to determine the net-match-score. This net-match-score becomes one element of the resultant feature vector. This procedure is repeated to compute the net-match-score value between the product name and the P-files of all 4-digit HS-Codes (or HS4-Codes in short), and the computed net-match-score values are stacked to form a feature vector 906 as shown in FIG. 9. Thus, the value of the first element of feature vector 906 corresponds to the net-match-score between the product name of the product being classified and the P-file of HS-Code prefix 3901, the value of the second element corresponds to the net-match-score between the product name of the product being classified and the P-file of HS-Code prefix 3902, and so on.

To form feature vector 908, a similar (but not necessarily identical) procedure may be applied for component descriptions of the product being classified and the C-files associated with 4-digit HS-Code prefixes. Notably, this involves sorting components of the product being classified based on their proportions, from highest to lowest. The top components with a cumulative share of 50% or more are identified. In practice, this set of top components usually contains at most 2-3 components. The dominating polymer or chemical from this set of components is determined, and the corresponding proportion of this dominating polymer/chemical is stored as $d_v$. The dominating component name is compared with the C-files to obtain corresponding net-match-score values and generate the vector 908 (FIG. 9), The complete feature vector is then formed by stacking $d_v$, feature vector 906 (P-vector, for short), and feature vector 908 (C-vector, for short).

Figure 11:
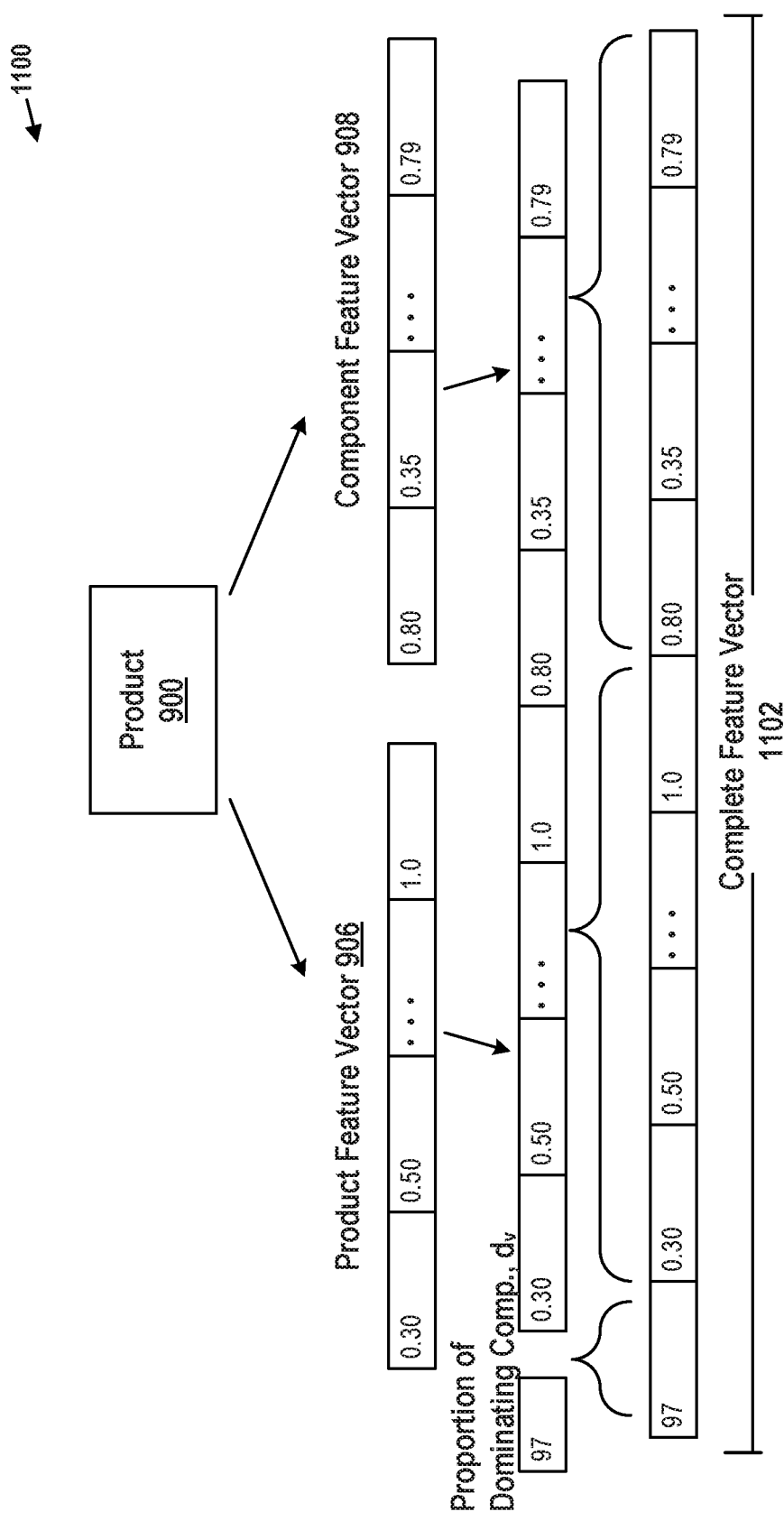
FIG. 11 depicts construction of aggregate feature vector, in accordance with example embodiments.

FIG. 11 shows this procedure as schematic 1100. Particularly, feature vector 906 and feature vector 908 are derived from information related to product 900. The corresponding proportion of the dominating component for this product, $d_v$, is obtained as discussed above. In FIG. 11, $d_v$ takes on a value of 97. Complete feature vector 1102 is formed by concatenating $d_v$, feature vector 906, and feature vector 908. In some embodiments, different sets of elements or orderings of elements may be used.

C. Training and Testing

The machine learning algorithm implemented to carry out HS-Code classification is a random forest classifier. The model is first trained using subset of data (known as training data) and then validated on another unseen (or testing) subset of the data. This section briefly explains an experimental setup implemented to train the random forest classifier. For the sake of simplicity, an explanation is provided for the HS4 classification task of predicting the first 4 digits (HS4-Code) of an HS-Code.

For a given class (say 3901), a list of products with the HS4-Code corresponding to that class label (say 3901) is extracted from a database. For class label 3901, this list is denoted by $L_{3901}$ and is split to form two subsets: $L_{3901}^{train}$ and $L_{3901}^{test}$. $L_{3901}^{train}$ contains training data and $L_{3901}^{test}$ contains testing data. The number of training and testing data-points present in training and testing datasets, respectively is governed by the train/test ratio, which can be set to 6/4, 7/3, 8/2, 9/1, etc. For the results below, a ratio of 7/3 was used. This ratio indicates that subset $L_{3901}^{train}$ contains about 70% of the total data and $L_{3901}^{test}$ contains about 30% of the total data. Training and testing subsets for other classes are generated in similar fashion. These training and testing subsets ($L_c^{train}$ and $L_c^{test}$, where c=3901, 3902, 3903, . . . , 3914) are merged to form the final training and testing sets, $L_c^{train}$ and $L_c^{test}$.

The random forest classifier is then trained on $L_c^{train}$. The resulting classifier is tested on set $L_c^{test}$. The accuracy of this classifier is calculated as $$C_a = \frac{n_{correct}}{n_{test}}$$

where $n_{correct}$ is the number of correctly classified data points of test data $L_c^{test}$ (i.e., data points for which the predicted class label from the random-forest classifier matched the actual class label documented in the database) and $n_{test}$ is the total number of testing data-points.

D. Preliminary Results

Ten random experiments were performed, each time with different testing and training data. The average accuracy score of these experiments was reported for the HS4 classification task (where the goal is to predict the first 4 digits of the HS-Code), HS6 classification task (where the goal is to predict the first 6 digits of the HS-Code), and HS10 classification task (where the goal is to predict the first 10 digits of the HS-Code). A constraint was imposed to have at least 10 products in a given class (i.e., an HS-Code prefix) in order to consider it in the classification task. A class with less than 10 products in the database was ruled out of the experiments, meaning that no data points from this class were used either in training or testing sets. The results for HS4, HS6 and HS10 classification tasks are provided below in Table 5.

TABLE 5

|  | HS4 | HS6 | HS10 |
| --- | --- | --- | --- |
| $C_a$ | 85.82% | 80.41% | 75.37% |

E. Post Analysis: Phase 1

As can be seen from Table 5, the accuracy score consistently dropped while predicting longer versions of the HS-Code prefixes. One reason for such a trend is reduction in the amount of data (i.e., the number of data points/products) in each class while going from lower-digit prediction (HS4) to a higher-digit prediction (HS6, HS10). For instance, say there were 100 products with an HS4-Code of 3901. These 100 products can have the following distribution within the 3901 heading: 30 products can have HS6-Code 390110, 30 can have 390120, 20 can have 390130 and 20 can have 390190. Thus, there are significantly fewer products in each class for the HS6 classification task as compared to the HS4 classification task. The situation worsens for the HS10 classification task.

In addition to that, the supplied information in the database was not adequate to predict some HS6 and HS10 codes. The database lacked information about essential product-features (such as specific gravity, elasticity, etc.) which are necessary to uniquely assign HS6 and HS10 codes. A method to handle this missing information is explained later.

The embodiments herein address the drawbacks of these preliminary results by performing the classification in a hierarchical, hybrid manner. First, HS4 classification occurs as described above, then a set of expert rules are used to deterministically predict the rest of the digits for HS6 and/or HS10 classification. Since successful prediction of HS6 or HS10 codes relies on the accuracy of HS4-Code prediction, it is desirable to have classification accuracy for predicting HS4-Codes as high as possible. A goal was set to achieve overall classification accuracy of 95% for predicting the HS4-Code.

In order to develop an automated classification tool that can improve upon human performance in terms of accuracy, it is helpful to obtain some insights from experts in the area of HS-Code assignment. For example, experts may use rules and/or mappings to provide a new product with an appropriate HS-Code. Investigation of these rules and/or mappings can aid in determining unique attributes and keywords pertaining to a particular HS-Code. Through this, new words were added to the P-files and/or C-files of various HS-Codes.

As shown in FIG. 10A, pseudocode 1000 can be used to compute the net-match-score value. In some embodiments, each word P-file or C-file can be given equal importance. This means that some words appearing fewer times were given the same weight (or emphasis) as those that appeared often in the $T_p$ file of FIG. 8A. However, it is expected that words occurring frequently within a P-file or C-file will have more relevance. Thus, each word in P-file or C-file can be assigned a weight based on its frequency of occurrence, where words with a higher frequency count are assigned a higher weight value.

A procedure 1200 for assigning such a weight value to a word in a P-file or C-file is shown in FIG. 12A. Notably, each word therein is assigned a weight value between 1 and 10 inclusive based on the word's frequency and/or input from an expert regarding the word's significance in classification. An example list 1202 of words with associated weights is shown in FIG. 12B.

Another improvement can be made by carrying out oversampling in classes with fewer samples. This is because the distribution of data in the supplied database was highly skewed, with some classes having hundreds of products while others had only tens of products. This imposes a bias during the training phase by placing more emphasis on classes with more data. To compensate for this bias, the SMOTE method of oversampling was used. SMOTE oversampling method creates synthetic data points around known data points. A synthetic data point is generated by randomly selecting two data points from the existing set and then choosing a random point on the line segment connecting the two previously selected data points. This process is repeated until the total number of data points matches the desired value. In the embodiments herein this desired value was set to max (size($L_c^{train}$)), where c=3901, 3902, 3903, . . . , 3914 and wherein size ($L_c^{train}$) is the number of data points in the set $L_c^{train}$. Oversampling may be performed on each $L_c^{train}$ set in order to have an equal number of training samples for all classes.

With the updated approach of using a weighted set of keywords to compute net-match-scores between the product name and/or component name and P-tiles and/or C-files, the accuracy score for HS4 classification improved from 85.82% to 91.6%. Nearly identical results were obtained with and without oversampling, suggesting that oversampling had almost no effect on the performance of the random-forest-based classifier. Also, in the experiments performed after suppressing the vector derived from the product file (i.e., the P-vector), no reduction in accuracy was observed. This revealed that the vector derived from the product file had negligible significance in the classification task. In other words, the textual information coming from product names had little to no influence on predicting the HS4-Code. One of the possible reasons for this would be that for the first 14 headings (i.e., 3901 to 3914), all the necessary information for predicting the HS4-Code was embedded in the component names of the product. Hence, in the experiments below, the vector derived from the product file was removed from the complete feature vector representation of the product.

F. Post Analysis: Phase 2

The overall accuracy score of 91.6% for HS4 classification was the best observed performance the random-forest-based classifier achieved using the techniques described above. Given the goal of 95% or better accuracy, a further post analysis was performed. Particularly, the analysis of misclassifications (i.e., the products which were incorrectly classified by the random-forest-based classifier) served as a foundation for further modification of the feature vector generation module.

Misclassifications are data points (chemical products in our case) that are predicted incorrectly, i.e. the predicted HS-Code does not match the ground truth HS-Code. Analysis on misclassifications helps determine bottlenecks and peculiarities of the overall algorithm.

TABLE 6

|        |         | Predicted |         |
|--------|---------|-----------|---------|
|        |         | Class A   | Class B |
| Actual | Class A | 70        | 30      |
|        | Class B | 2         | 98      |

Table 6 shows an example confusion matrix that compares the predictions from a classifier to their actual, ground truth values. In the table, there are two classes (class A and class B), with total 100 products in each class. The off-diagonal elements in the confusion matrix are the misclassifications. In this example, 30 elements belonging to class A are predicted as being in class B, while 2 elements that are actually in class B are predicted as being in class A. Thus, class A is predicted with 70% accuracy and class B is predicted with 98% accuracy. In this case, improving the accuracy of predictions of elements belonging to class A can significantly improve the overall performance of the classifier.

A confusion matrix of size 14×14 was generated for the 14 HS4-Code subheadings of Chapter 39, as shown in FIG. 5. Misclassifications were systematically analyzed using this confusion matrix and were clustered into the following four categories: type 1 (incorrectly predicted by the classifier but correctly classified in the product database), type 2 (correctly predicted by the classifier but incorrectly classified in the database), type 3 (incorrectly predicted by the classifier and incorrectly classified in the database), and type 4 (products with incomplete or missing information).

The products that were incorrectly classified in the database affected the training phase of classifier development by misguiding it with incorrect classification logic. On the other hand, in some situations the classifier was able to correctly predict the HS4-Code of products that were incorrectly classified in the database. Thus, the classifier has a potential to sense errors and suggest possible corrections for the database.

Products with incomplete or missing information had an ambiguous feature vector representation. These products typically lacked information about the dominating monomers and the proportions thereof.

Amongst the four categories listed above, the key area to focus was the category where the classifier incorrectly predicted products that were correctly classified in the database. Products falling under this category were analyzed, and it was observed that their component names followed specific patterns.

This led to a pattern matching approach for component names based on regular expressions. Pattern-based feature extraction is more generic than matching keywords and component names, as it has a potential to target a complete family of products using only handful of patterns. For example, the olefin class of chemicals, where the chemical name ends with letters "ene", can be represented with the regular expression "*ene" (where the * can match a text string of any length).

The following is a list of patterns used for certain chemical families and the corresponding regular-expressions representing these patterns that were developed: olefins (words ending with "ene"), polyols ("ol" at the end of a word, the presence of a "oxy"+"ene" combination in the word, or an olefin+"oxide" combination), esters (words ending with "ate" or the presence of an "acid"+ polyol combination).

Another advantage of regular-expression-based feature extraction lies in its ability to create high bias for a particular pattern, thereby facilitating unique feature extraction for chemical names. This idea can be better understood from the following example.

The subheading 3902 contains products with olefins as their primary/dominating components. Practically, it is not possible to prepare an exhaustive list of all olefin names and store them in the C-file for subheading 3902 as a bag-of-words. From the literature, it is known that olefins are hydrocarbons with one or more carbon-carbon double bonds and their names usually end with the letters "ene". So one of the regular expressions for representing most of the names of olefin-based chemical components is "*ene", as discussed before.

Assume that the C-file for subheading 3902 contains only two words, "propene" and "butene", and no regular expressions. If there is a new product with "propane" as its dominating component, this product will have a high string similarity match-score (or net-match-score) value with the C-file of subheading 3902 (due to the presence of the word "propene"). On the other hand, a product with "hexene" as its dominating component will have a relatively low string similarity match score with the C-file of subheading 3902. Hence, the "propane"-based compound will have more chance of being classified as HS4-Code 3902 than will the chemical compound with "hexene" as its ingredient.

This situation can be improved by using the regular expression "*ene" and conducting regular-expression-based pattern matching. The word "hexene" will have a regular expression pattern match score of 1 (i.e., a 100% match), while the word "propane" will have a regular expression pattern match score of 0 (i.e., no match). In order to give more emphasis to the regular-expression-based pattern match score, its value was multiplied by a weight of 1000 while computing the net-match-score of FIG. 10A. In this way, the regular expression (*ene)-based feature extraction will isolate a majority of non-olefin-based products from the products with olefins as dominating components.

Notably, the feature vector representation of a product was still the same—the addition was the inclusion of regular expressions in the C-files. When the dominating component name of the product had a match with a regular expression in the C-file, the net-match-score value was incremented by 1000. After comparison of the name of the dominating component with the regular expression pattern, its pattern-match-score (which could either be 0 or 1) was first multiplied with the weight value of 1000 and added to the net-match-score value as shown in FIG. 10B.

For some misclassifications, it was observed that products with identical dominating components had different HS4-Codes. For instance, the ethene propene co-polymer appeared as a dominating component for products with HS4-Codes 3901 and 3902. The deciding parameter to address this ambiguity and obtain a unique HS4-Code, was the co-monomer ratio. In the current example, if ethene was dominating (i.e. overall ethane content was larger than that of propene), then the HS4-Code would be 3901, else it would be 3902. Thus, synthetic information about the co-monomer ratios was supplied under the assumption that the HS4-Code given in the database is correct. For instance, if the HS4-Code in the database was 3901, the ethene content was manually set to a value larger than 50%.

After incorporating the above-mentioned modifications, the resulting accuracies for each HS4-Code, as well as the number of data points used per HS4-Code, are shown in Table 7.

TABLE 7

| HS4-Code | Accuracy | Data Points |
|---|---|---|
| 3901 | 98.8% | 508 |
| 3902 | 93.4% | 188 |
| 3903 | 96.6% | 156 |
| 3904 | 95.2% | 75 |
| 3905 | 88.7% | 88 |
| 3906 | 92.4% | 81 |
| 3907 | 90.0% | 295 |
| 3908 | 81.3% | 14 |
| 3909 | 95.7% | 202 |
| 3910 | 95.5% | 296 |
| 3911 | 94.6% | 77 |
| 3912 | 98.3% | 279 |
| 3913 | 90.8% | 18 |
| 3914 | 96.0% | 93 |

The random forest classifier assigns a confidence score between 0.0 and 1.0, inclusive, to each class under consideration. The predicted class for a given product is the class with the maximum confidence score. For the current product database, it was observed in all the experiments that the confidence score of the predicted class was considerably higher than the confidence score of all other classes (at least greater than by a margin of 0.5). For this reason, the final output from the classifier suggests only one unique HS4-Code for any given product.

However, the procedure to suggest multiple HS4-Codes can be incorporated in the proposed framework. The output from the classifier, which is a list of HS4-Codes with their corresponding confidence scores, is passed through a two stage filter. The first stage of the filter flags HS4-Codes with a confidence score larger than a user-specified threshold value $\pi_A$. These flagged HS4-Codes are then passed through the second stage of the filter in which HS4-Codes with confidence score value within a $\pi_B$ margin of the maximum confidence score value are shortlisted. These shortlisted HS4-Codes with their corresponding confidence score values, serve as the final output from the classifier.

G. Predicting HS6 and H10 Classifications

The HS4-Code prediction was done using auto-generated decision trees based on the random-forest technique. The random forest classifier may be trained on training data and tested on separate and distinct testing data. Classification of the HS-Code from the fifth digit onwards can be done using an expert tree.

Expert trees are custom coded decision trees developed using expert knowledge. They can have complex rules at their nodes. Within a given HS4-Code (i.e., once the HS4-Code has been predicted), there is a clear set of rules to determine other digits of the full HS-Code. These rules are generally based on chemical properties such as specific gravity, elasticity, viscosity, etc., and are binary in nature.

For example, if the HS4-Code is 3901, deciding whether the HS6-code will be 390110 or 390120 involves checking the specific gravity of the product (see Table 4). If the specific gravity is less than 0.94, the product will have HS6-Code of 390110, else the HS6-Code will be 390120. There are relatively few considerations when predicting higher digits beyond 4 digits of HS-code, and most of the cases/classes can be easily differentiated from one another. Hence, it is possible to attain 100% accuracy in predicting HS-Code digits if the HS4-Code classification is correct. Also, since the rules are pre-determined from expert knowledge and WCO notes, the expert trees are not data-driven (i.e., they don't need training data for model development). Another advantage of custom coded expert rules is that they are easy to modify. This aspect is can be important because HS-Codes beyond 4 digits can undergo periodic updates, which thereby changes the rules for some HS-Codes. For example, the first six digits of HS-Codes are revised every five years. Being data-independent and custom-coded, expert trees are compliant enough to be adapted to new rules.

Figure 13:
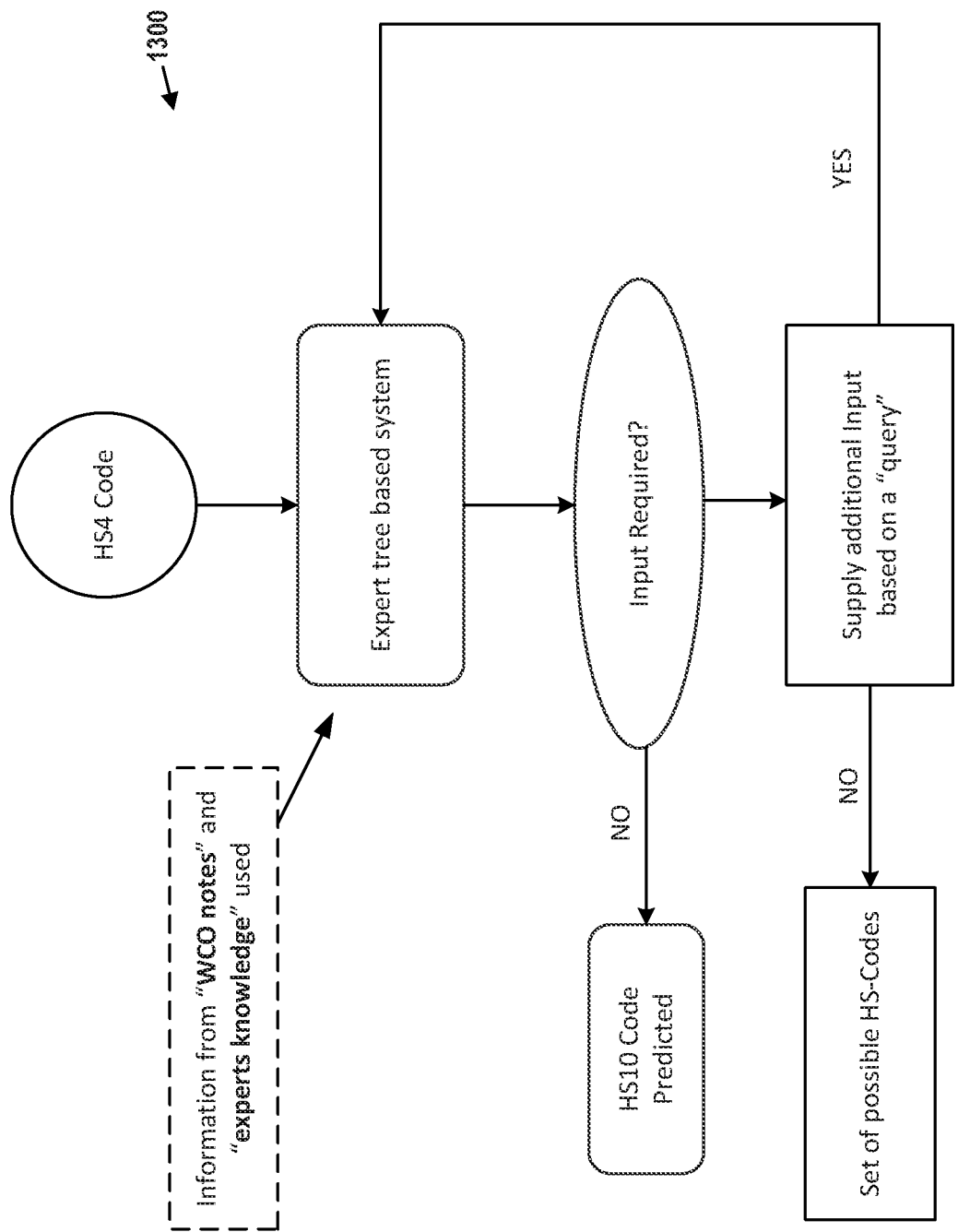
FIG. 13 is a flow chart, in accordance with example embodiments.

In addition to this, a query-based system is also integrated into expert trees. Flow chart 1300 of FIG. 13 depicts queries used in conjunction with a hybrid. HS4 classifier and expert tree system. Under some situations, the CAS-number is used in an expert rule to directly determine the HS10-Code. In other cases, where there is not enough information to make an expert rile prediction, the system may query the user. The query-based system was designed to collect additional information systematically through a set of guided questions. For instance, if the specific gravity of the product is not known but is needed for HS6 classification, the system may request this information as input from the user.

As noted above, a product database typically lacks some information (e.g., specific gravity, co-monomer ratio, elasticity, etc.) necessary to early out classification beyond four digits and predict the full HS-Code. Thus, to validate the concept and test the expert tree based system, synthetic information was artificially generated under the assumption that the HS-Codes for products already classified in the product database were correct. For instance, if a product was assigned an HS6-Code of 390110 in the product database, then it is assumed to have a specific-gravity less than 0.94. Since the product database didn't provide any information about specific gravity, this information can be manually supplied by assigning any random value less than 0.94 to all products with an HS6-code of 390110. This information can then be used to predict HS-Codes for other products with unknown HS-Codes.

Figure 14:
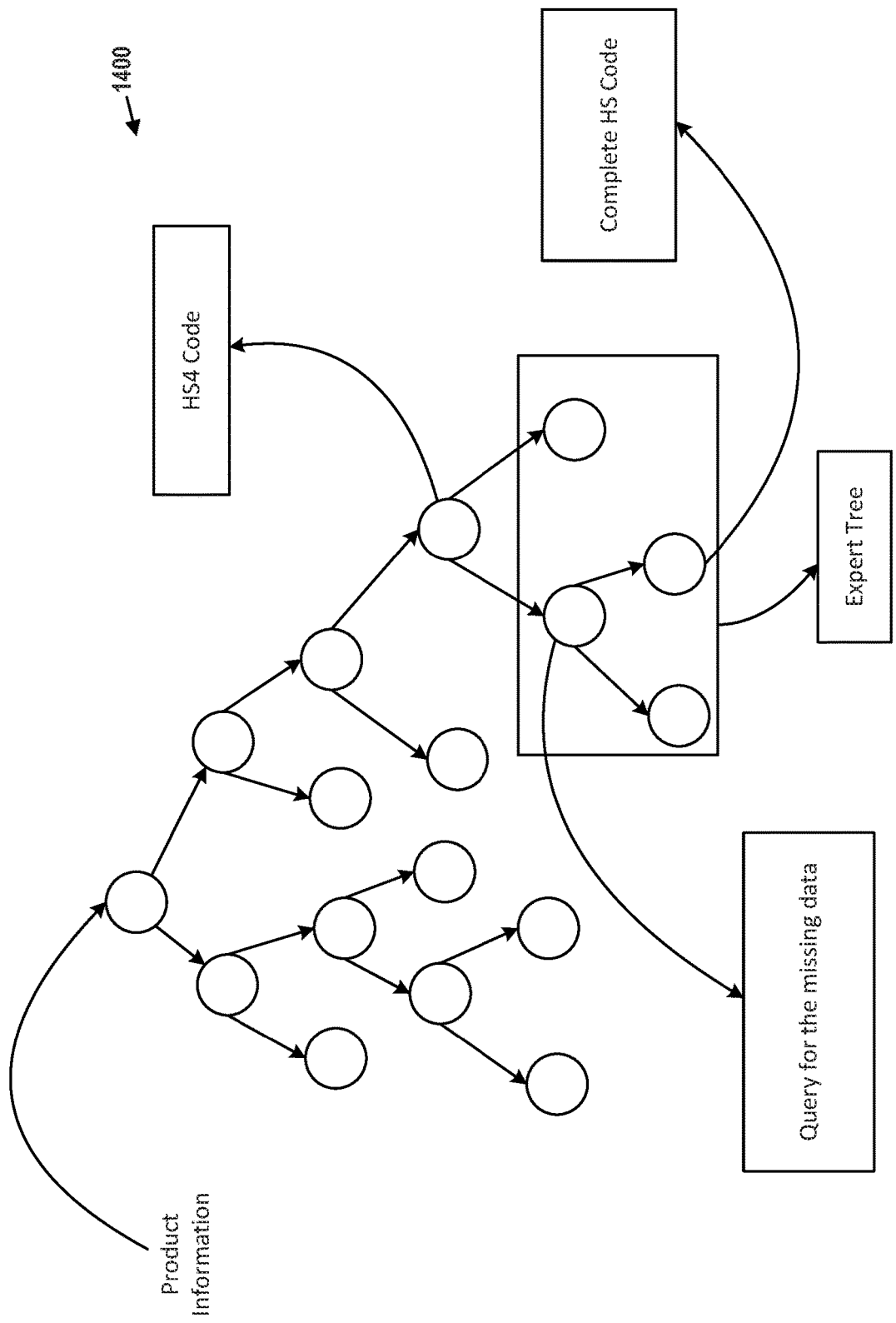
FIG. 14 is a diagrammatic view of a hybrid machine learning classifier, in accordance with example embodiments.

FIG. 14 is a diagram 1400 that provides an overview of the overall classification procedure. The product information is used as input to the random forest to predict an HS4-Code. Once the HS4-code is determined, the product information is the used to predict the remaining six digits of the HS10-Code. This is done using the expert tree based system. The expert tree is custom coded tree with sequential logic based on if-else statements. If the supplied product information lacks essential information to determine a unique HS10-Code, the expert system asks for additional input using a query-based interface. The system also suggests a list of possible HS10-Codes if it is not able to converge to just one due to lack of information.

As an example, consider a product under subheading 3901. Assume that the random forest classifier was able to correctly predict the HS4-Code. The hierarchy that follows subheading 3901 for determining next two digits (i.e., to generate the 6-digit HS6-Code) is shown below.

390110: Polyethylene having a specific gravity of less than 0.94.

390120: Polyethylene having a specific gravity of 0.94 or more.

390130: Ethylene-vinyl acetate copolymers.

390140: Ethylene-alpha-olefin copolymers, having a specific gravity of less than 0.94.

390190: Other.

The first level of the expert tree will seek ethylene content as an input. The value provided will further partition the list of HS6-Codes into two categories: 390110 and 390120 where the ethylene content is greater than or equal to 95%, and 390130, 390140, and 390190 where the ethylene content is less than 95%. If information for ethylene content is missing, the expert tree will generate a query message asking the user to input the ethylene content. If the information is not available, the expert tree will give all HS1.0-Codes that have the first four digits as 3901 as an output.

Suppose that the ethylene content of the product is known to be greater than 95%. As mentioned before, this will result in two possible cases for HS6-Codes: 390110 and 390120. The expert tree system then checks for the specific gravity of the product. If the value of specific gravity is greater than 0.94, the expert tree will predict the HS6-Code to be 390120, else the expert tree will predict the HS6-Code to be 390110.

Assuming that the product has a specific gravity of 0.98, the expert tree will then assign it HS6-Code 390120. Next, there are two possible HS10-Codes: 3901201000 (for products having a relative viscosity of 1.44 or more), and 3901205000 (for any other product). If the information on relative viscosity is missing in the product database, a query is generated to seek the value of relative viscosity as a user-supplied input. In the situation where the information of relative viscosity is unavailable, the expert tree will terminate with both HS10-Codes (390120100 and 3901205000) as the final output.

Features necessary for an expert tree to predict HS10-Codes will vary depending on the logic path taken for product classification. In the above test example, the features sought were polyethylene content, specific gravity and relative viscosity (the path was 3901 to 390120 to 3901201000). If the product has the HS-Code 3902201000, the features sought by the expert tree in chronological order would be: (1) propylene content and iso-butylene content to determine the HS6-Code, and (2) elasticity (elastomeric or not) to determine the HS10-Code.

Figure 15:
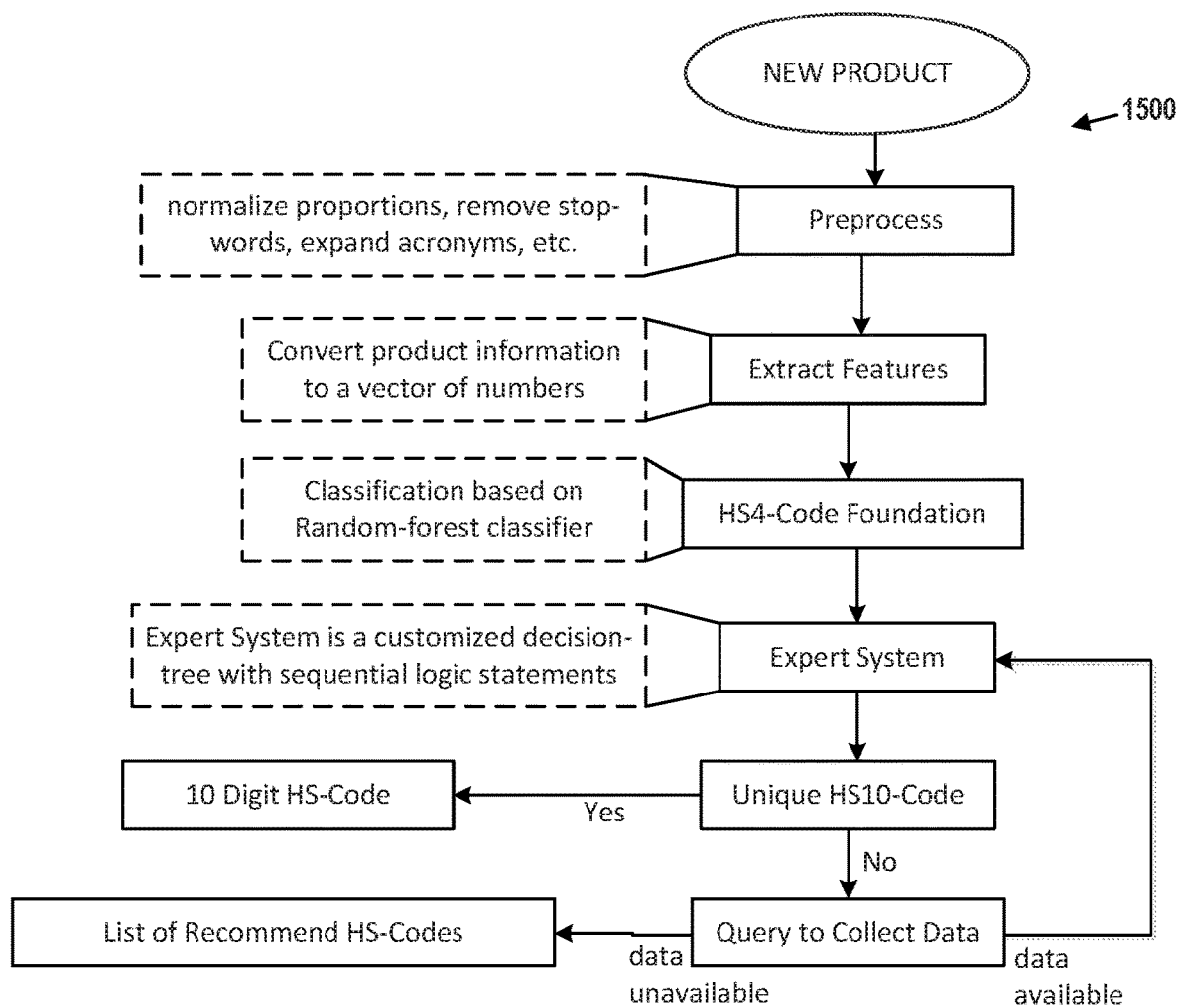
FIG. 15 is a flow chart, in accordance with example embodiments.

Another view of the overall product classification process is shown in diagram 1500 of FIG. 15. It is assumed that the product is in Chapter 39 and is polymer based. In the feature extraction stage, information provided in terms of the product recipe (i.e., list of chemical components and their corresponding proportions) is utilized to generate a feature vector. The final output will be either a full 10-digit HS-Code, or a list of recommended HS-Codes.

TABLE 8

| Classification | HS4 | HS6 | HS10 |
| --- | --- | --- | --- |
| Prediction Accuracy | 95.3% | 100% | 100% |

The overall accuracy of the classification process is shown in Table 8. The HS6-Code and HS10-Code prediction accuracies are computed after the HS4 classification occurs and is assumed to be correct.

It is evident from these results that a machine-learning-based autonomous system can perform highly-accurate HS-Code classification. The approach herein also serves as a mechanism to sense anomalies in the product database by systematically analyzing the confusion matrix. Since this approach is generic, variations of it can be used for HS-Code classification of other chapters of the Harmonized Tariff Schedule Code, or classification of products or services to any form of code.

V. Example Operations

FIGS. 16-19 are flow charts illustrating example embodiments. The processes illustrated by FIGS. 16-19 may be carried out by a computing device, such as computing device 100, and/or a cluster of computing devices, such as server cluster 200. However, the processes can be carried out by other types of devices or device subsystems. For example, the processes could be carried out by a portable computer, such as a laptop or a tablet device.

The embodiments of FIGS. 16-19 may be simplified by the removal of any one or more of the features shown therein. Further, these embodiments may be combined with features, aspects, and/or implementations of any of the previous figures or otherwise described herein.

Figure 16:
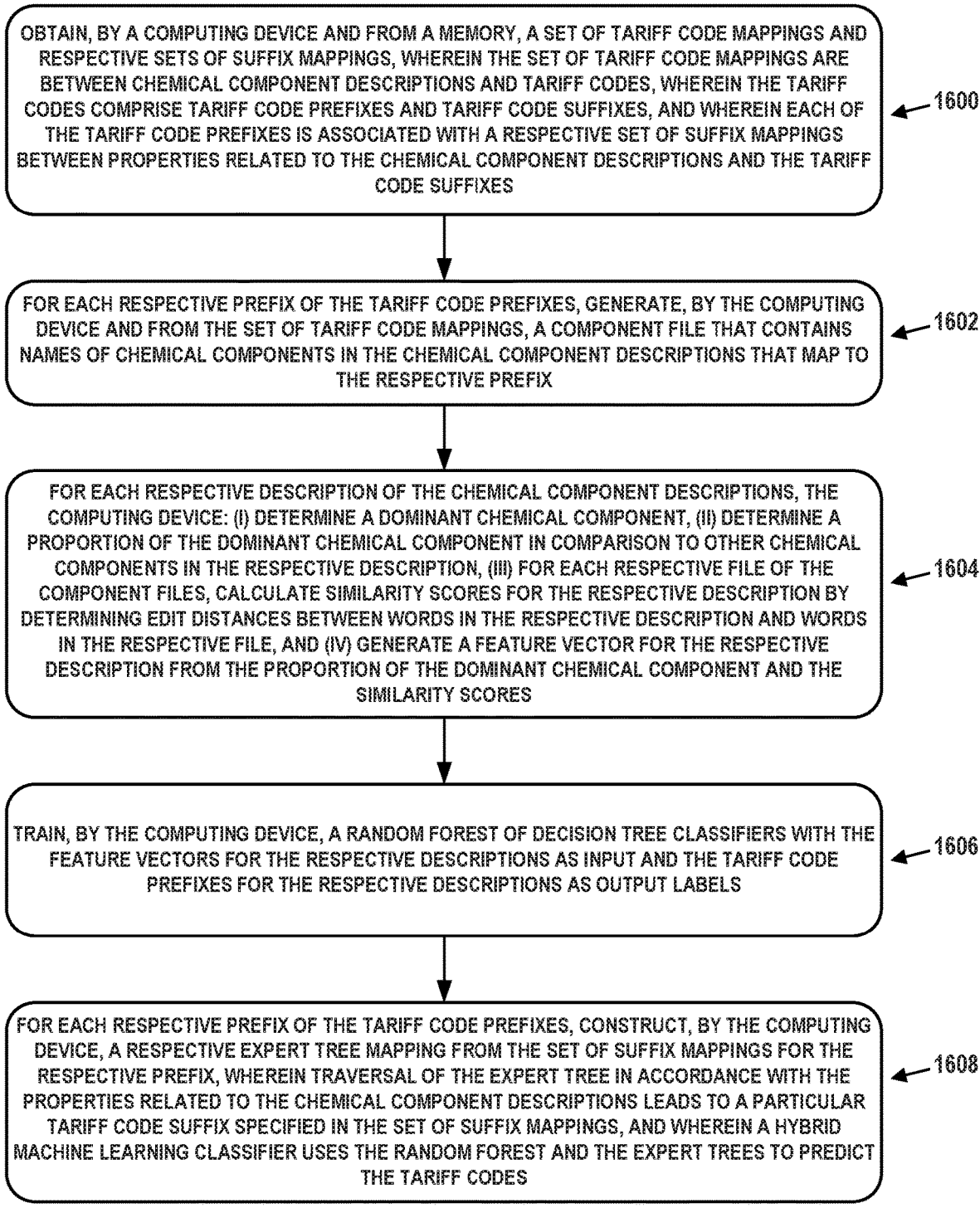
FIG. 16 is a flow chart, in accordance with example embodiments.

The flow chart of FIG. 16 may be directed to training a hybrid machine learning classifier. Accordingly, block 1600 may involve obtaining, from a memory, a set of tariff code mappings and respective sets of suffix mappings, where the set of tariff code mappings are between chemical component descriptions and tariff codes, where the tariff codes comprise tariff code prefixes and tariff code suffixes, and where each of the tariff code prefixes is associated with a respective set of suffix mappings between properties related to the chemical component descriptions and the tariff code suffixes.

Block 1602 may involve, for each respective prefix of the tariff code prefixes, generating, from the set of tariff code mappings, a component file that contains names of chemical components in the chemical component descriptions that map to the respective prefix.

Block 1604 may involve, for each respective description of the chemical component descriptions: (i) determining a dominant chemical component, (ii) determining a proportion of the dominant chemical component in comparison to other chemical components in the respective description, (iii) for each respective file of the component files, calculating similarity scores for the respective description by determining edit distances between words in the respective description and words in the respective file, and (iv) generating a feature vector for the respective description from the proportion of the dominant chemical component and the similarity scores.

Block 1606 may involve training a random forest of decision tree classifiers with the feature vectors for the respective descriptions as input and the tariff code prefixes for the respective descriptions as output labels.

Block 1608 may involve, for each respective prefix of the tariff code prefixes, constructing a respective expert tree mapping from the set of suffix mappings for the respective prefix, where traversal of the expert tree in accordance with the properties related to the chemical component descriptions leads to a particular tariff code suffix specified in the set of suffix mappings, and where a hybrid machine learning classifier uses the random forest and the expert trees to predict the tariff codes.

In some embodiments, the memory is disposed within a database device that is physically separate from a computing device carrying out the embodiment.

In some embodiments, the tariff codes are n digits long, the tariff code prefixes are j digits long, and the tariff code suffixes are n-j digits long, where j is less than n. For example, n may be 10 and j may be 4.

In some embodiments, the tariff code prefixes are defined by a single chapter of a Harmonized Tariff Schedule Code.

In some embodiments, generating the component file may involve combining, in the component file, the names of chemical components in the chemical component descriptions that map to the respective prefix, and removing, from the component file, punctuation and stopwords. In these embodiments, generating the component file may further involve counting respective frequencies of the words in the component file, selecting the words in the component file with respective frequencies greater than a threshold value, and removing non-selected words from the component file.

In some embodiments, at least one of the words in the component file is represented as a regular expression.

In some embodiments, determining the edit distances comprises calculating normalized Levenshtein distances between the words in the respective description and the words in the respective file.

In some embodiments, the similarity scores are calculated based on a sum of the edit distances.

Figure 17:
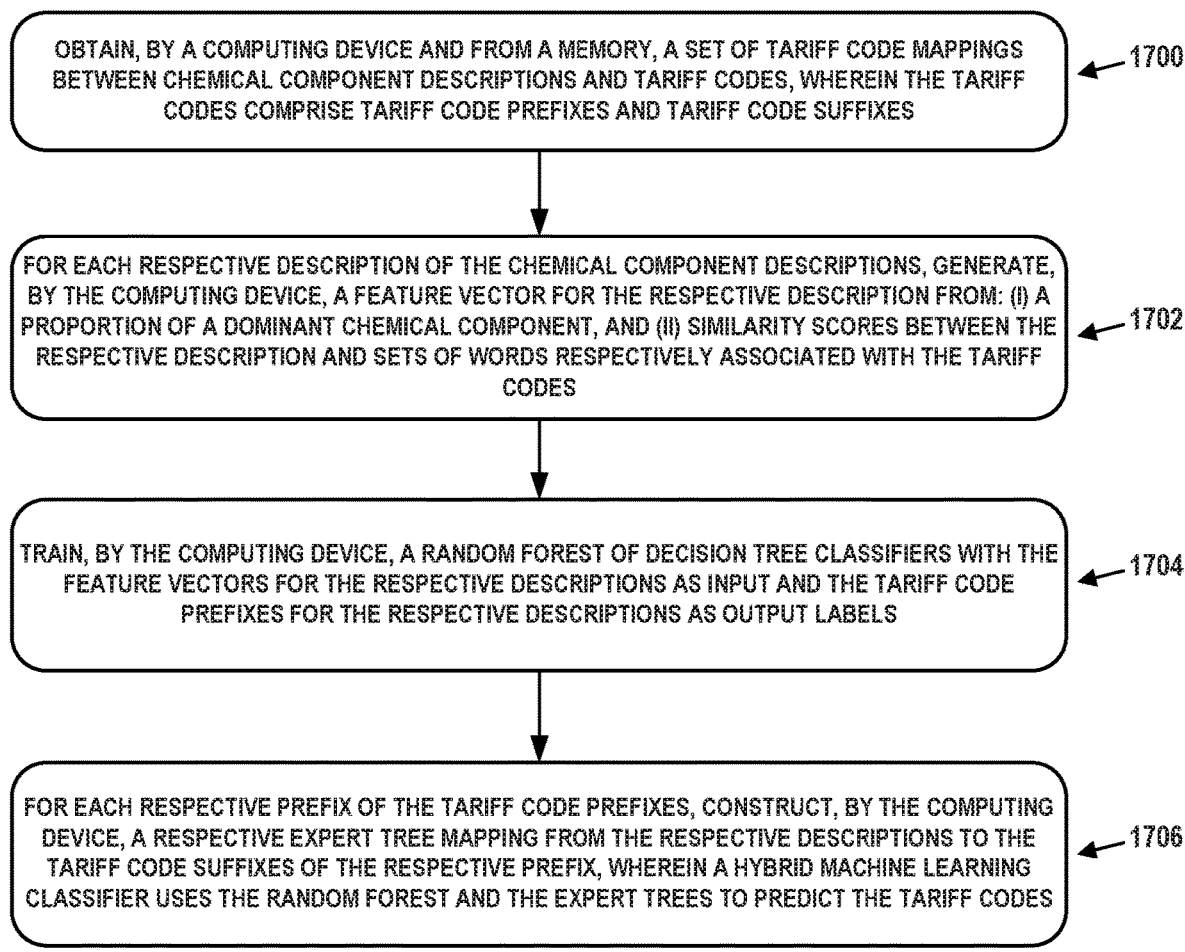
FIG. 17 is a flow chart, in accordance with example embodiments.

The flow chart of FIG. 17 may also be directed to training a hybrid machine learning classifier. Thus, any of the additional features described in the context of FIG. 16 (or any other figure) may be applied to the flow chart of FIG. 17.

Block 1700 may involve obtaining, from a memory, a set of tariff code mappings between chemical component descriptions and tariff codes, where the tariff codes comprise tariff code prefixes and tariff code suffixes.

Block 1702 may involve, for each respective description of the chemical component descriptions, generating a feature vector for the respective description from: (i) a proportion of a dominant chemical component, and (ii) similarity scores between the respective description and sets of words respectively associated with the tariff codes.

Block 1704 may involve training a random forest of decision tree classifiers with the feature vectors for the respective descriptions as input and the tariff code prefixes for the respective descriptions as output labels.

Block 1706 may involve, for each respective prefix of the tariff code prefixes, constructing a respective expert tree mapping from the respective descriptions to the tariff code suffixes of the respective prefix, where a hybrid machine learning classifier uses the random forest and the expert trees to predict the tariff codes.

Figure 18:
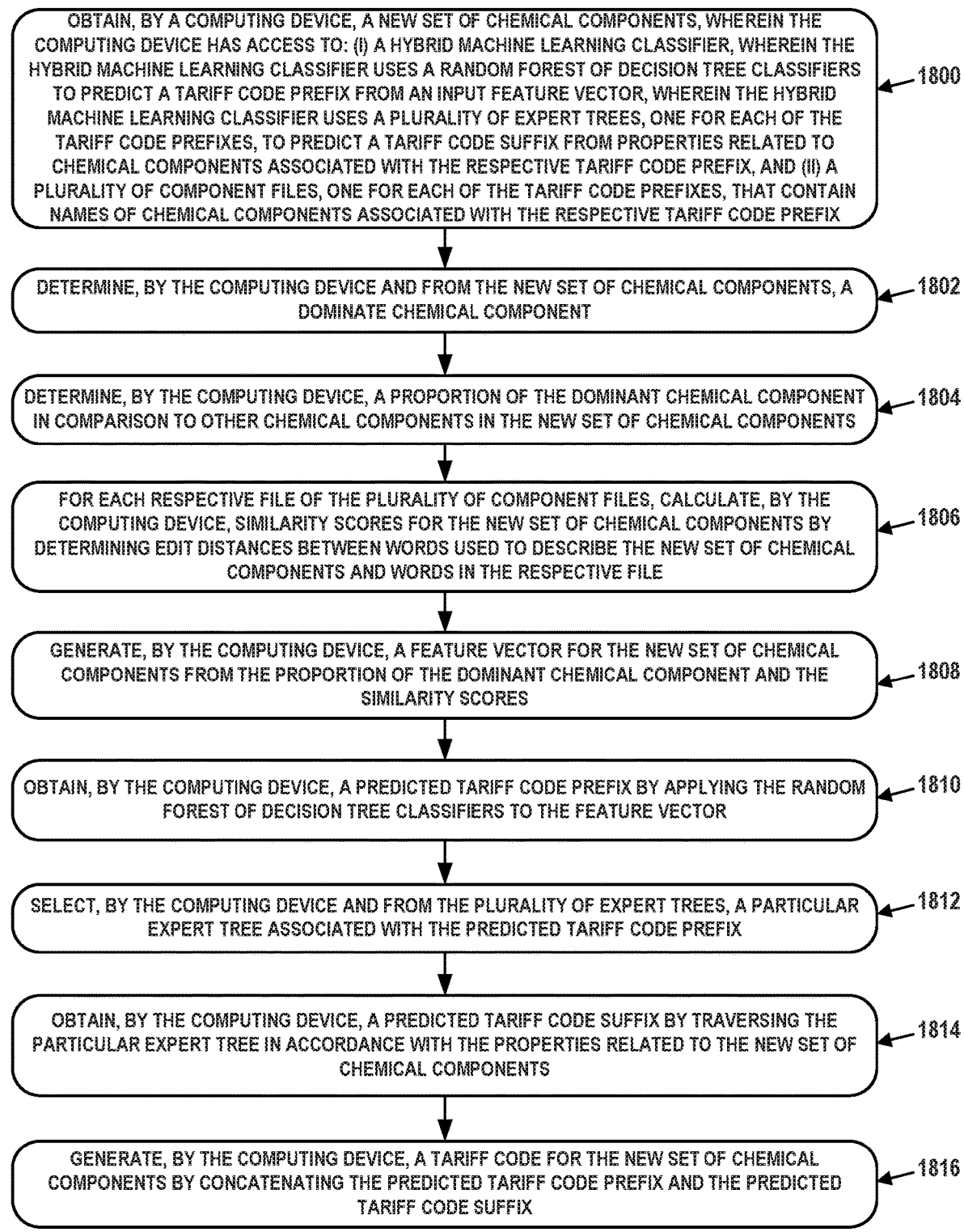
FIG. 18 is a flow chart, in accordance with example embodiments.

The flow chart of FIG. 18 may be directed to using a trained hybrid machine learning classifier. Accordingly, block 1800 may involve obtaining a new set of chemical components, where the access is available to: (i) a hybrid machine learning classifier, where the hybrid machine learning classifier uses a random forest of decision tree classifiers to predict a tariff code prefix from an input feature vector, where the hybrid machine learning classifier uses a plurality of expert trees, one for each of the tariff code prefixes, to predict a tariff code suffix from properties related to chemical components associated with the respective tariff code prefix, and (ii) a plurality of component files, one for each of the tariff code prefixes, that contain names of chemical components associated with the respective tariff code prefix.

Block 1802 may involve determining, from the new set of chemical components, a dominant chemical component.

Block 1804 may involve determining a proportion of the dominant chemical component in comparison to other chemical components in the new set of chemical components.

Block 1806 may involve, for each respective file of the plurality of component files, calculating similarity scores for the new set of chemical components by determining edit distances between words used to describe the new set of chemical components and words in the respective file.

Block 1808 may involve generating a feature vector for the new set of chemical components from the proportion of the dominant chemical component and the similarity scores.

Block 1810 may involve obtaining a predicted tariff code prefix by applying the random forest of decision tree classifiers to the feature vector.

Block 1812 may involve selecting, from the plurality of expert trees, a particular expert tree associated with the predicted tariff code prefix.

Block 1814 may involve obtaining a predicted tariff code suffix by traversing the particular expert tree in accordance with the properties related to the new set of chemical components.

Block 1816 may involve generating a tariff code for the new set of chemical components by concatenating the predicted tariff code prefix and the predicted tariff code suffix.

In some embodiments, the memory is disposed within a database device that is physically separate from a computing device carrying the embodiment.

In some embodiments, the tariff code is n digits long, the tariff code prefixes are j digits long, and the tariff code suffixes are n-j digits long, where j is less than n. In some embodiments, n may be 10 and j may be 4.

In some embodiments, the tariff code prefixes are defined by a single chapter of a Harmonized Tariff Schedule Code.

In some embodiments, calculating similarity scores for the new set of chemical components involves: determining words related to the new set of chemical components, and removing, from the determined words, punctuation and stopwords. Calculating the similarity scores for the new set of chemical components may further involve expanding any acronyms in the determined words.

In some embodiments, at least one of the words in the plurality of component files is represented as a regular expression.

In some embodiments, determining the edit distances comprises calculating normalized Levenshtein distances between the words used to describe the new set of chemical components and names in the respective file.

In some embodiments, the similarity scores are calculated based on a sum of the edit distances.

Figure 19:
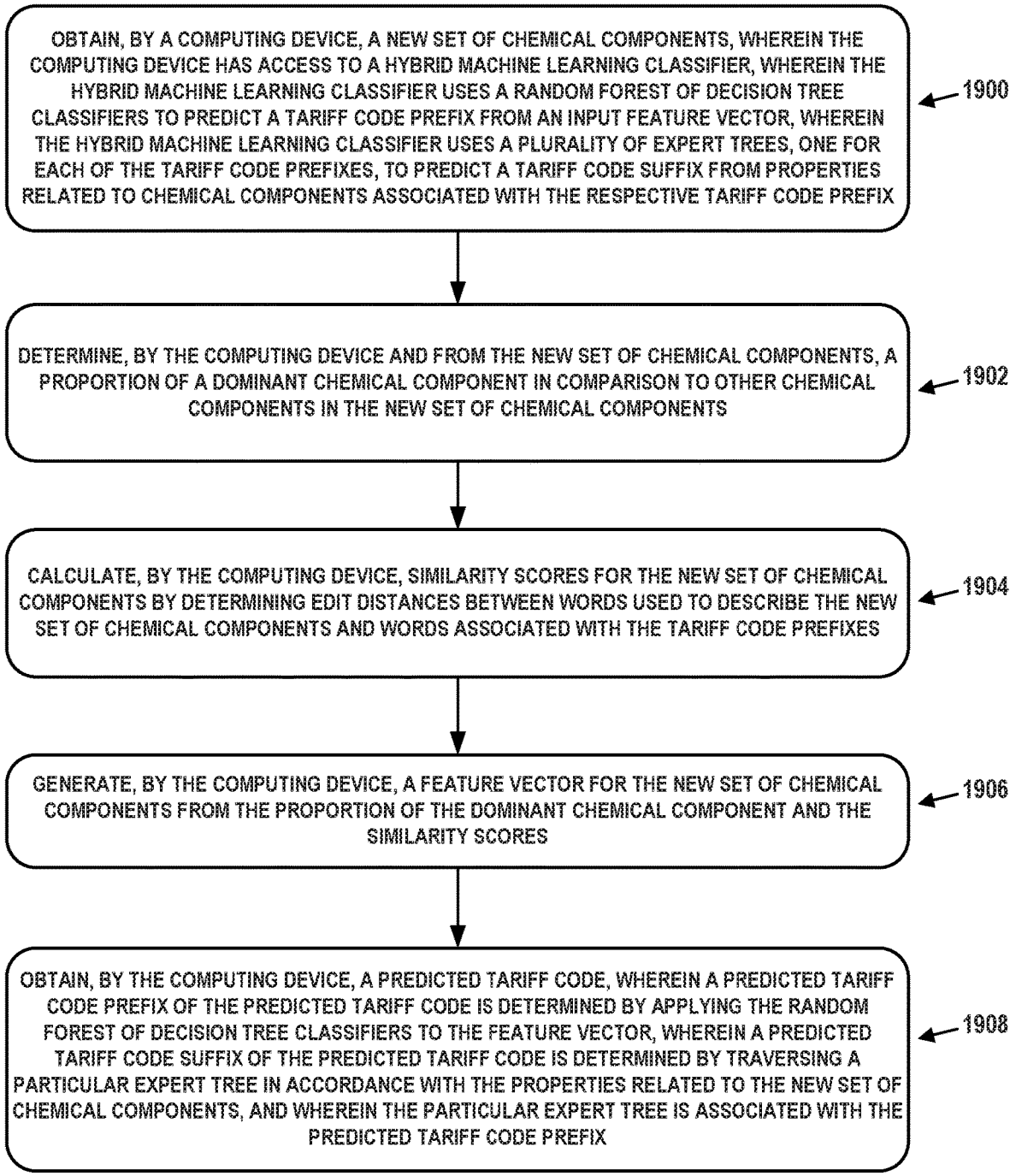
FIG. 19 is a flow chart, in accordance with example embodiments.

The flow chart of FIG. 19 may also be directed to using a trained hybrid machine learning classifier. Thus, any of the additional features described in the context of FIG. 18 (or any other figure) may be applied to the flow chart of FIG. 19.

Block 1900 may involve obtaining a new set of chemical components, where the computing device has access to a hybrid machine learning classifier, where the hybrid machine learning classifier uses a random forest of decision tree classifiers to predict a tariff code prefix from an input feature vector, where the hybrid machine learning classifier uses a plurality of expert trees, one for each of the tariff code prefixes, to predict a tariff code suffix from properties related to chemical components associated with the respective tariff code prefix.

Block 1902 may involve determining, and from the new set of chemical components, a proportion of a dominant chemical component in comparison to other chemical components in the new set of chemical components.

Block 1904 may involve calculating similarity scores for the new set of chemical components by determining edit distances between words used to describe the new set of chemical components and words associated with the tariff code prefixes.

Block 1906 may involve generating a feature vector for the new set of chemical components from the proportion of the dominant chemical component and the similarity scores.

Block 1908 may involve obtaining a predicted tariff code, where a predicted tariff code prefix of the predicted tariff code is determined by applying the random forest of decision tree classifiers to the feature vector, where a predicted tariff code suffix of the predicted tariff code is determined by traversing a particular expert tree in accordance with the properties related to the new set of chemical components, and where the particular expert tree is associated with the predicted tariff code prefix.

VI. Additional Embodiments

As noted previously, the hybrid approach described herein can be applied to classification tasks other than that of HS-Codes. To that point, FIG. 20 depicts information that can be used to classify items into HS-Codes 2000, dangerous goods codes 2002, and export control classification number codes (ECCN) 2004. Notably, this information is similar across these different types of codes, which suggests that the framework above can be adapted more broadly. For instance, a similar combination of random forest techniques and expert tree techniques could be used to predict the dangerous goods codes and/or ECCN codes of various products.

To illustrate that point, FIG. 21 provides an example decision tree 2100 for ECCN codes. This decision tree could be used as an expert tree, not unlike the information in Table 4, for example.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
  a memory containing: (i) a hybrid machine learning classifier, wherein the hybrid machine learning classifier uses a random forest of decision tree classifiers to predict a tariff code prefix from an input feature vector, wherein the hybrid machine learning classifier uses a plurality of expert trees, one for each of a plurality of tariff code prefixes, to predict a tariff code suffix from properties related to chemical components associated with the tariff code prefixes, (ii) a plurality of product files, one for each of the tariff code prefixes, that contains information for products associated with the tariff code prefix, and (iii) a plurality of component files, one for each of the tariff code prefixes, that contain names of chemical components associated with the tariff code prefix; and
  a computing device including one or more processors that perform operations comprising:
    obtain a new set of chemical components associated with a product;
    determine, from the new set of chemical components, a dominant chemical component;
    determine a proportion of the dominant chemical component in comparison to other chemical components in the new set of chemical components;
    for each respective product file of the plurality of product files, calculate similarity scores for a product name associated with the product by determining edit distances between words used for the product name and words in the respective product file;
    for each respective component file of the plurality of component files, calculate similarity scores for the new set of chemical components by determining edit distances between words used to describe the new set of chemical components and words in the respective component file;
    generate a feature vector including elements corresponding to each of the calculated similarity scores for the product name and elements corresponding to each of the calculated similarity scores for the new set of chemical components;
    obtain a predicted tariff code prefix by applying the random forest of decision tree classifiers to the feature vector;
    select, from the plurality of expert trees, a particular expert tree associated with the predicted tariff code prefix;
    obtain a predicted tariff code suffix by traversing the particular expert tree in accordance with the properties related to the new set of chemical components;
    generate a tariff code for the new set of chemical components by concatenating the predicted tariff code prefix and the predicted tariff code suffix; and
    automatically labelling the product with the generated tariff code.

2. The system of claim 1, wherein the memory is disposed within a database device that is physically separate from the computing device.

3. The system of claim 1, wherein the tariff code is n digits long, the tariff code prefixes are j digits long, and the tariff code suffix is n-j digits long, wherein j is less than n.

4. The system of claim 3, wherein n is 10 and j is 4.

5. The system of claim 1, wherein the tariff code prefixes are defined by a single chapter of a Harmonized Tariff Schedule Code.

6. The system of claim 1, wherein calculating the similarity scores for the new set of chemical components comprises:
  determining words related to the new set of chemical components; and
  removing, from the determined words, punctuation and stopwords.

7. The system of claim 6, wherein calculating the similarity scores for the new set of chemical components further comprises:
  expanding any acronyms in the determined words.

8. The system of claim 1, wherein at least one of the words in the plurality of component files is represented as a regular expression.

9. The system of claim 1, wherein determining the edit distances for the product name comprises calculating normalized Levenshtein distances between the words used for the product name and words in the respective product file, wherein determining the edit distances for the new set of chemical components comprises calculating normalized Levenshtein distances between the words used to describe the new set of chemical components and names in the respective component file.

10. The system of claim 1, wherein the similarity scores for the product name and the new set of chemical components are calculated based on a sum of the respective edit distances.

11. A computer-implemented method comprising:
  obtaining, by a computing device, a new set of chemical components associated with a product, wherein the computing device has access to: (i) a hybrid machine learning classifier, wherein the hybrid machine learning classifier uses a random forest of decision tree classifiers to predict a tariff code prefix from an input feature vector, wherein the hybrid machine learning classifier uses a plurality of expert trees, one for each of a plurality of tariff code prefixes, to predict a tariff code suffix from properties related to chemical components associated with the tariff code prefixes, (ii) a plurality of product files, one for each of the tariff code prefixes, that contains information for products associated with the tariff code prefix, and (iii) a plurality of component files, one for each of the tariff code prefixes, that contain names of chemical components associated with the tariff code prefixes;
  determining, by the computing device and from the new set of chemical components, a dominant chemical component;
  determining, by the computing device, a proportion of the dominant chemical component in comparison to other chemical components in the new set of chemical components;
  for each respective product file of the plurality of product files, calculating similarity scores for a product name associated with the product by determining edit distances between words used for the product name and words in the respective product file;

for each respective component file of the plurality of component files, calculating, by the computing device, similarity scores for the new set of chemical components by determining edit distances between words used to describe the new set of chemical components;

generating, by the computing device, a feature vector including elements corresponding to each of the calculated similarity scores for the product name and elements corresponding to each of the calculated similarity scores for the new set of chemical components from the proportion of the dominant chemical component and the similarity scores;

obtaining, by the computing device, a predicted tariff code prefix by applying the random forest of decision tree classifiers to the feature vector;

selecting, by the computing device and from the plurality of expert trees, a particular expert tree associated with the predicted tariff code prefix;

obtaining, by the computing device, a predicted tariff code suffix by traversing the particular expert tree in accordance with the properties related to the new set of chemical components;

generating, by the computing device, a tariff code for the new set of chemical components by concatenating the predicted tariff code prefix and the predicted tariff code suffix; and automatically labelling the product with the generated tariff code.

12. The computer-implemented method of claim 11, wherein the tariff code is n digits long, the tariff code prefixes are j digits long, and the tariff code suffix is n-j digits long, wherein j is less than n.

13. The computer-implemented method of claim 12, wherein n is 10 and j is 4.

14. The computer-implemented method of claim 11, wherein the tariff code prefixes are defined by a single chapter of a Harmonized Tariff Schedule Code.

15. The computer-implemented method of claim 11, wherein calculating the similarity scores for the new set of chemical components comprises:
determining words related to the new set of chemical components; and
removing, from the determined words, punctuation and stopwords.

16. The computer-implemented method of claim 15, wherein calculating the similarity scores for the new set of chemical components further comprises:
expanding any acronyms in the determined words.

17. The computer-implemented method of claim 11, wherein at least one of the words in the plurality of component files is represented as a regular expression.

18. The computer-implemented method of claim 11, wherein determining the edit distances for the product name comprises calculating normalized Levenshtein distances between the words used for the product name and words in the respective product file, wherein determining the edit distances for the new set of chemical components comprises calculating normalized Levenshtein distances between the words used to describe the new set of chemical components and names in the respective component file.

19. The computer-implemented method of claim 11, wherein the similarity scores for the product name and the new set of chemical components are calculated based on a sum of the respective edit distances.

20. A computer-implemented method comprising:
obtaining, by a computing device, a new set of chemical components associated with a product, wherein the computing device has access to: (i) a hybrid machine learning classifier, wherein the hybrid machine learning classifier uses a random forest of decision tree classifiers to predict a tariff code prefix from an input feature vector, wherein the hybrid machine learning classifier uses a plurality of expert trees, one for each of a plurality of tariff code prefixes, to predict a tariff code suffix from properties related to chemical components associated with the tariff code prefixes, (ii) a plurality of product files, one for each of the tariff code prefixes, that contains information for products associated with the tariff code prefix, and (iii) a plurality of component files, one for each of the tariff code prefixes, that contain names of chemical components associated with the tariff code prefixes;

determining, by the computing device and from the new set of chemical components, a proportion of a dominant chemical component in comparison to other chemical components in the new set of chemical components;

for each respective product file of the plurality of product files, calculating, by the computing device, similarity scores for a product name associated with the product by determining edit distances between words used for the product name and words in the respective product file;

for each respective component file of the plurality of component files, calculating, by the computing device, similarity scores for the new set of chemical components by determining edit distances between words used to describe the new set of chemical components and words in the respective component files;

generating, by the computing device, a feature vector including elements corresponding to each of the calculated similarity scores for the product name and elements corresponding to each of the calculated similarity scores for the new set of chemical components;

obtaining, by the computing device, a predicted tariff code, wherein a predicted tariff code prefix of the predicted tariff code is determined by applying the random forest of decision tree classifiers to the feature vector, wherein a predicted tariff code suffix of the predicted tariff code is determined by traversing a particular expert tree in accordance with the properties related to the new set of chemical components, and wherein the particular expert tree is associated with the predicted tariff code prefix; and automatically labelling the product with the predicted tariff code.

* * * * *